United States Patent
Yamazaki

(10) Patent No.: US 11,204,979 B2
(45) Date of Patent: Dec. 21, 2021

(54) LICENSE MANAGEMENT METHOD AND APPARATUS

(71) Applicant: CANON KABUSHIKI KAISHA, Tokyo (JP)

(72) Inventor: Daisuke Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

(21) Appl. No.: 14/955,974

(22) Filed: Dec. 1, 2015

(65) Prior Publication Data

US 2016/0162668 A1 Jun. 9, 2016

(30) Foreign Application Priority Data

Dec. 4, 2014 (JP) .............................. JP2014-246349

(51) Int. Cl.
*G06F 21/10* (2013.01)
*G06F 3/0482* (2013.01)
*H04L 29/06* (2006.01)

(52) U.S. Cl.
CPC .......... *G06F 21/105* (2013.01); *G06F 3/0482* (2013.01); *G06Q 2220/18* (2013.01); *H04L 67/42* (2013.01)

(58) Field of Classification Search
None
See application file for complete search history.

(56) References Cited

U.S. PATENT DOCUMENTS

| 5,204,897 A | * | 4/1993 | Wyman | G06F 21/10 705/59 |
| 5,671,412 A | * | 9/1997 | Christiano | G06Q 30/04 |
| 5,892,900 A | * | 4/1999 | Ginter | G06F 21/10 726/26 |
| 6,915,278 B1 | * | 7/2005 | Ferrante | G06F 21/105 380/201 |

(Continued)

FOREIGN PATENT DOCUMENTS

| JP | 07-200492 A | 8/1995 |
| JP | 2003-108281 A | 4/2003 |

OTHER PUBLICATIONS

Xiaoshe et al. Floating License Sharing System in Grid Environment—Proceedings of the First International Conference on Semantics, Knowledge, and Grid (SKG 2005) (Year: 2005).*

(Continued)

*Primary Examiner* — Jacob C. Coppola
*Assistant Examiner* — Eduardo Castilho
(74) *Attorney, Agent, or Firm* — Canon U.S.A., Inc., IP Division

(57) ABSTRACT

A client apparatus determines whether a license system of an application is a node-locked system or a floating system when the application is activated. The client apparatus further determines whether a node-locked license is acquired if it is determined that the license system of the application is the node-locked system. The client apparatus initializes a user interface to display a license-required function in an enabled state if the node-locked license of the node-locked (Continued)

system is acquired or the license system is the floating system. The client apparatus initializes a user interface to display the license-required function in a disabled state if the node-locked license of the node-locked system is not acquired.

15 Claims, 14 Drawing Sheets

(56) References Cited

U.S. PATENT DOCUMENTS

| | | | | |
|---|---|---|---|---|
| 7,703,142 | B1* | 4/2010 | Wilson | G06F 21/105 380/59 |
| 2001/0011253 | A1* | 8/2001 | Coley | G06F 21/10 705/59 |
| 2002/0067364 | A1* | 6/2002 | Lane | G06F 16/972 345/531 |
| 2003/0076362 | A1* | 4/2003 | Terada | G06F 3/0486 715/781 |
| 2005/0094176 | A1* | 5/2005 | Matsuishi | G06F 9/45512 358/1.13 |
| 2006/0287959 | A1* | 12/2006 | Blecken | G06Q 10/10 705/59 |
| 2007/0150834 | A1* | 6/2007 | Muller | G06F 3/04817 715/810 |
| 2008/0209393 | A1* | 8/2008 | Evensen | G06F 8/43 717/108 |
| 2013/0212602 | A1* | 8/2013 | Yamazaki | G06F 13/102 719/321 |
| 2014/0201710 | A1* | 7/2014 | Bakthavachalam | G06F 8/70 717/120 |
| 2014/0331151 | A1* | 11/2014 | Schuepp | G06F 3/0481 715/762 |

OTHER PUBLICATIONS

Dalheimer et al. GenLM: License Management for Grid and Cloud Computing Environments 9th IEEE/ACM International Symposium on Cluster Computing and the Grid 2009 (Year: 2009).*

Mulliner et al. Hidden GEMs: Automated Discovery of Access Control Vulnerabilities in Graphical User interfaces 2014 IEEE Symposium on Security and Privacy May 2014 (Year: 2014).*

Zhao et al. Policy Driven Licensing Model for Component Software IEEE 4th International Workshop on Policies for Distributed Systems and Networks POLICY 2003 (Year: 2003).*

Ferrante—Software Licensing Models: What's Out There? IT Pro Nov.-Dec. 2006 (Year: 2006).*

* cited by examiner

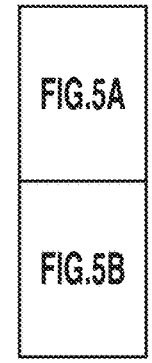
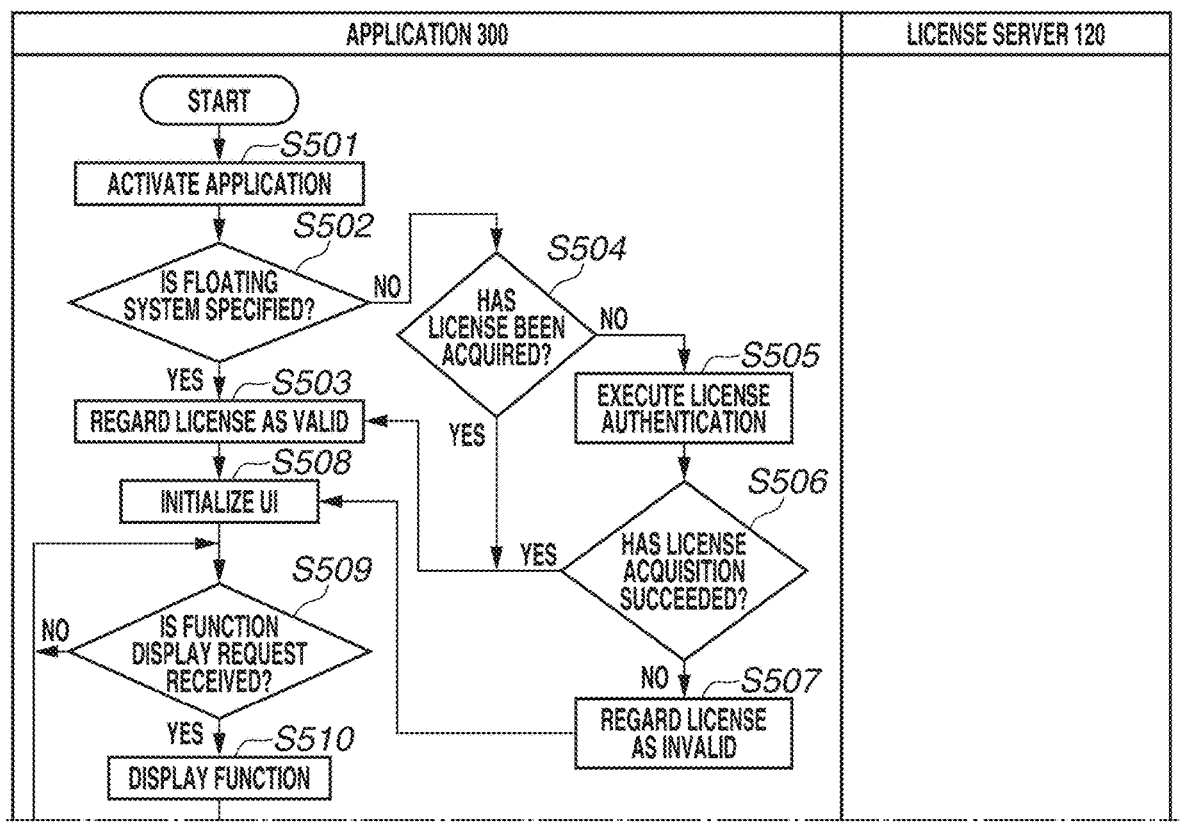

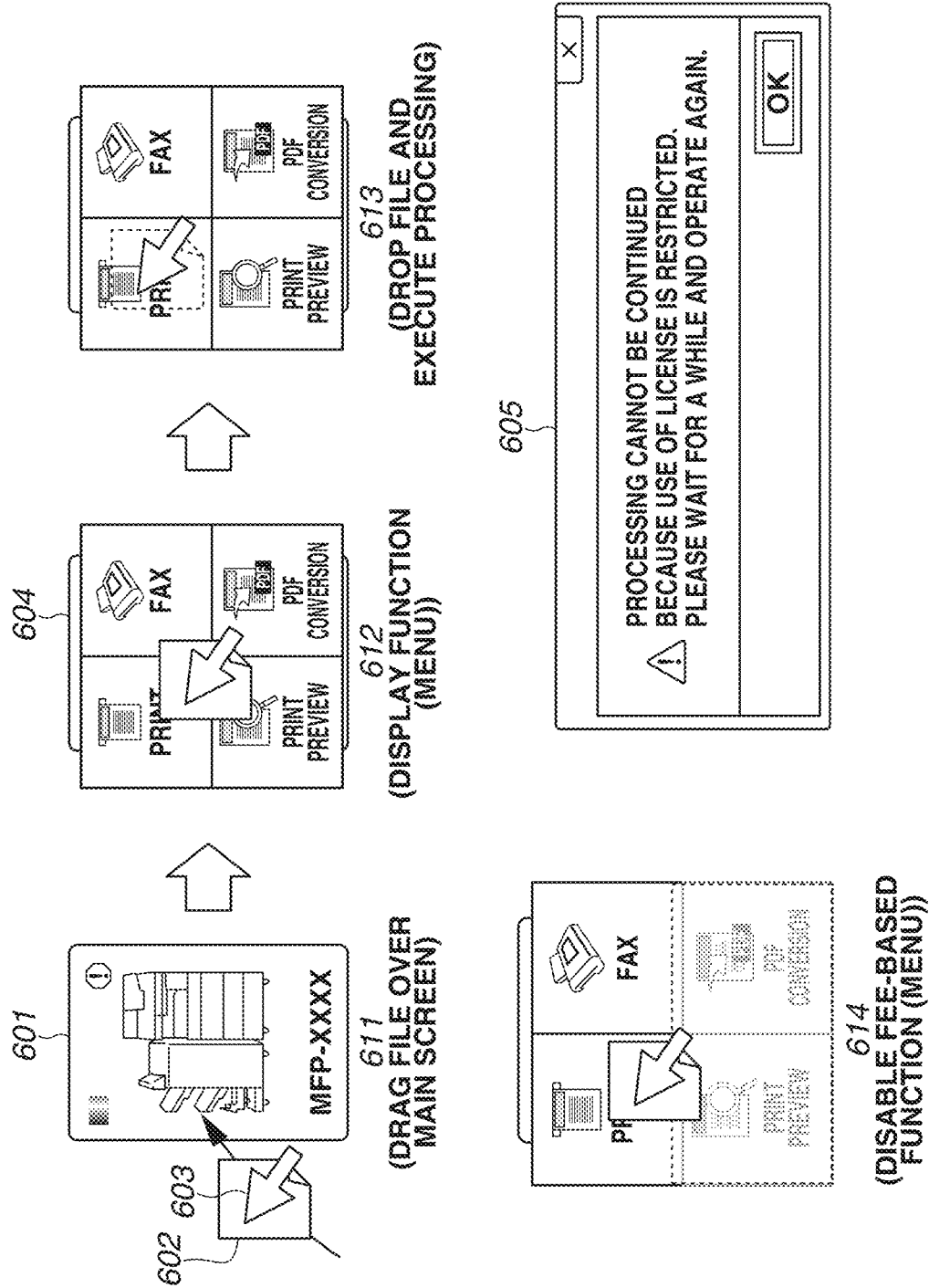

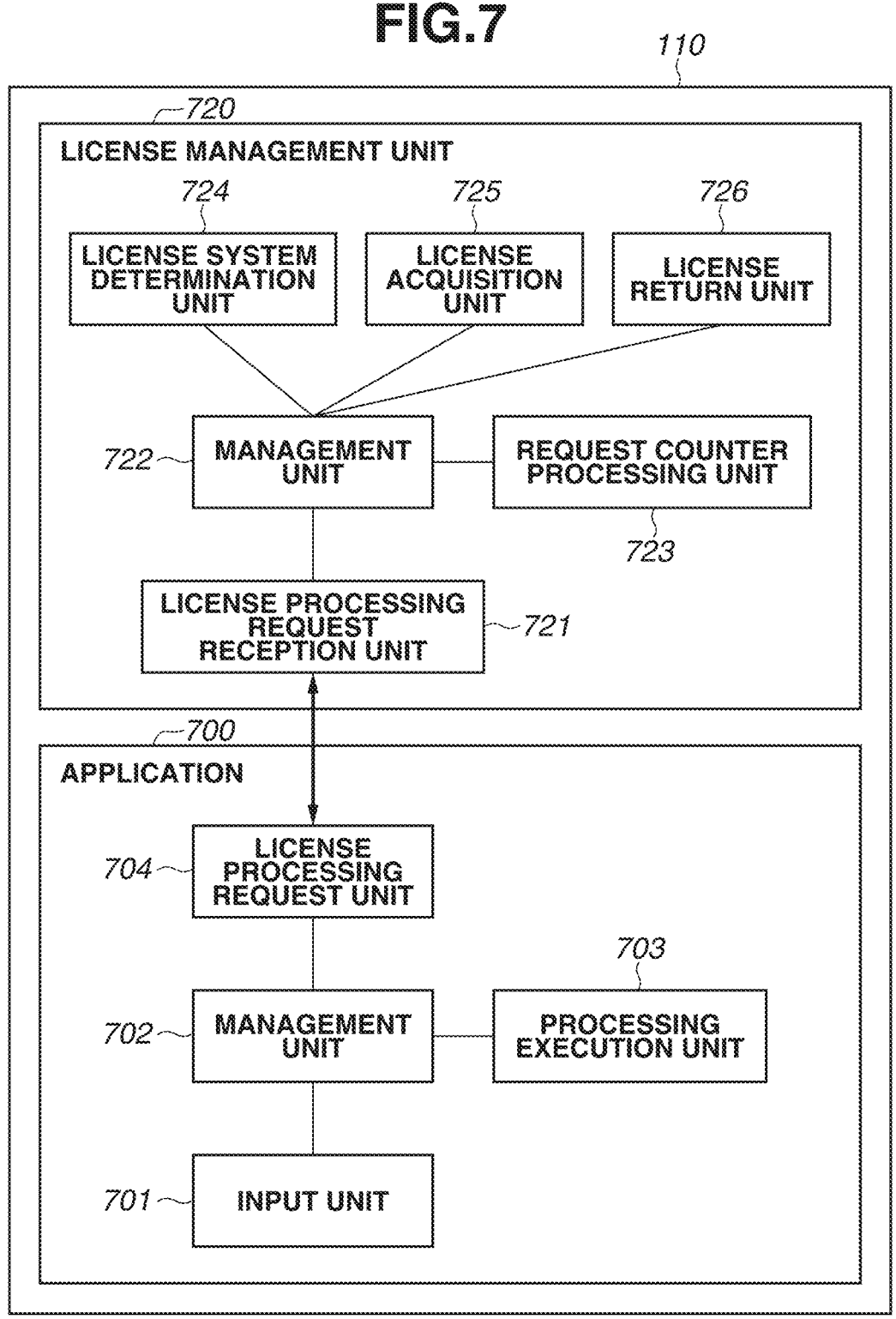

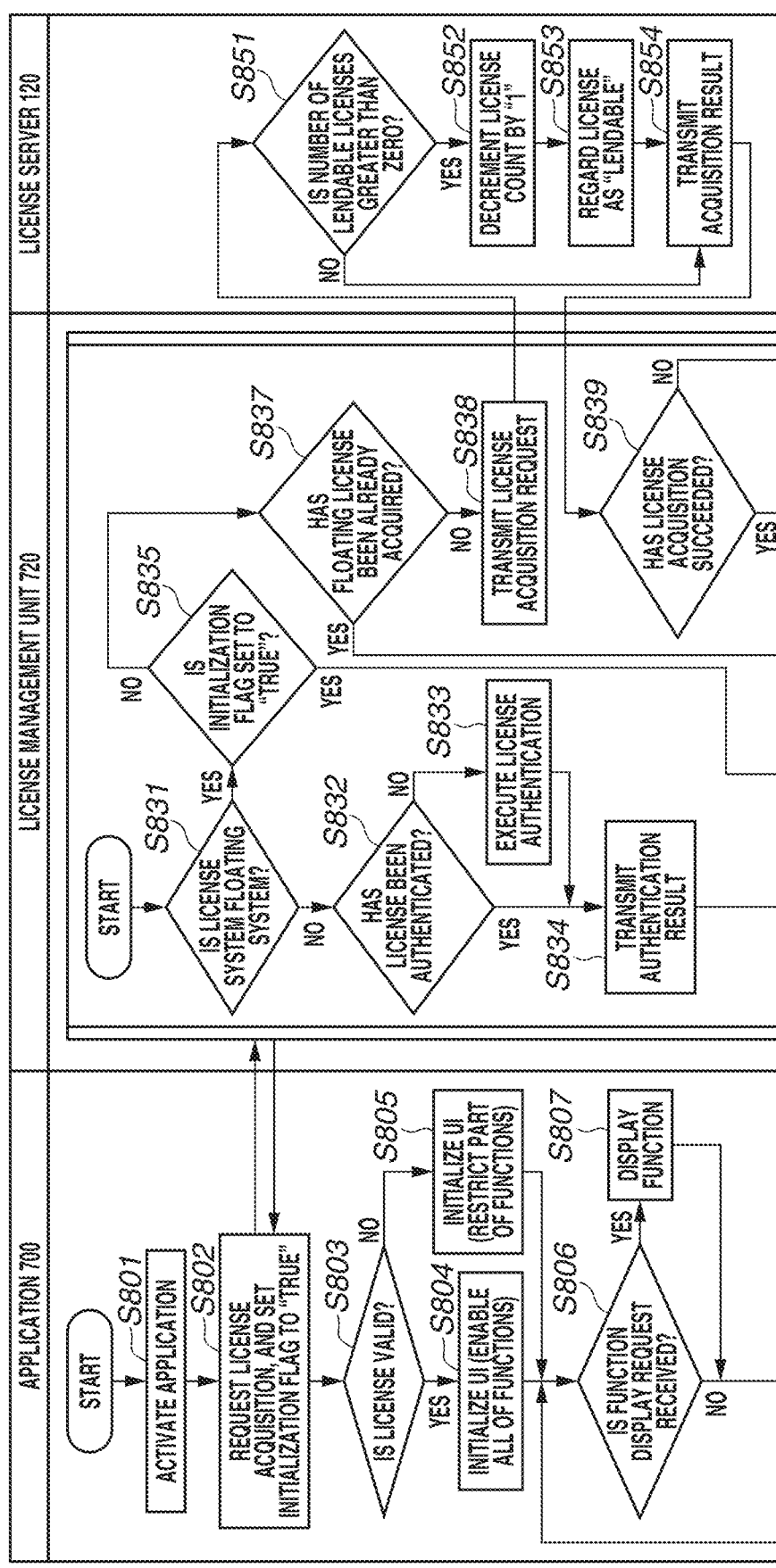

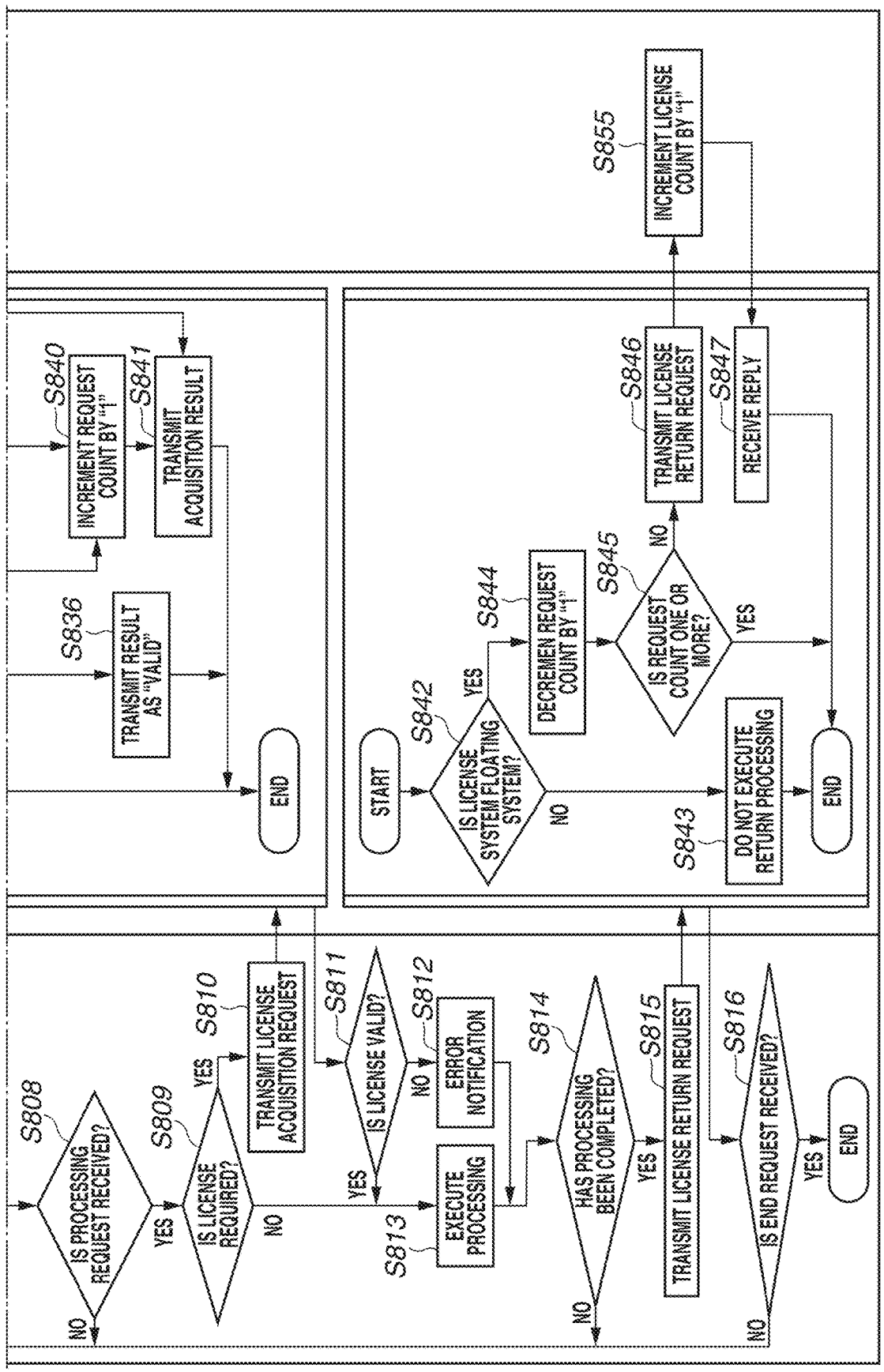

FIG.11
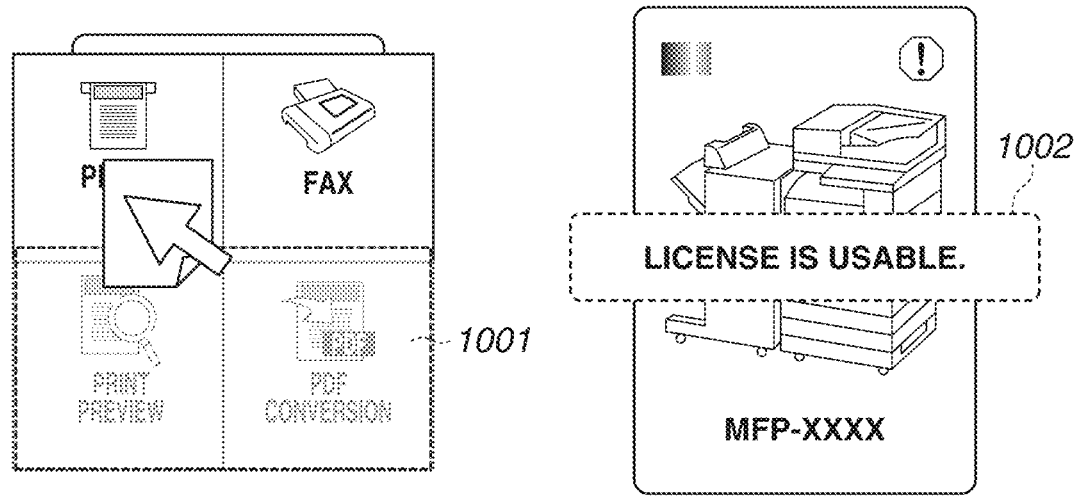
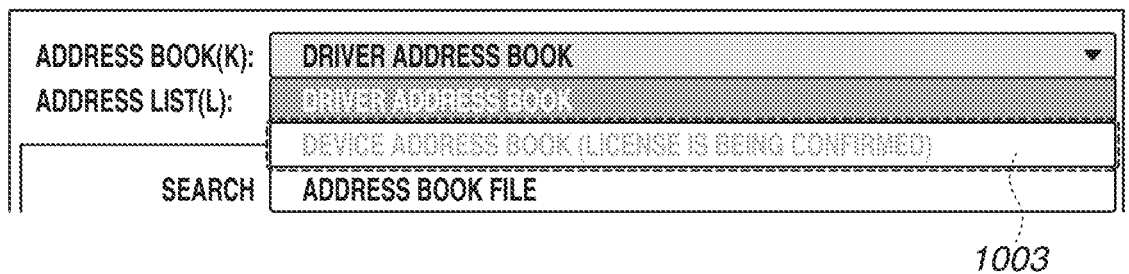
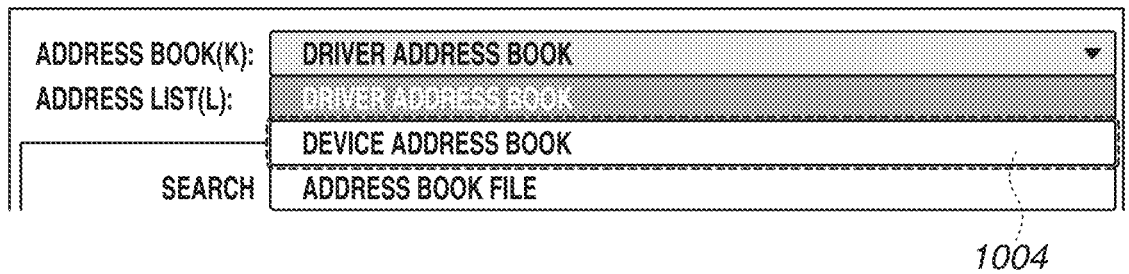

LICENSE MANAGEMENT METHOD AND APPARATUS

BACKGROUND OF THE INVENTION

Field of the Invention

The present invention relates to license management of an application.

Description of the Related Art

A node-locked license system (i.e. a node-locked system) and a floating license system (i.e. a floating system) are provided as methods for licensing a fee-based application to a client apparatus (client). In the node-locked system, a client directly acquires a license from a main license server, and the license is fixed to the client in which an application is installed. On the other hand, in the floating system, a local license server that pools in advance a predetermined number of licenses (i.e., licenses that can be used simultaneously) temporarily lends a license to a client, so that the client is allowed to use the application temporarily. A floating license managed by the floating system is returned to the local license server when the client has finished using a corresponding application. Therefore, another client can use the same application by acquiring the returned license. If each of clients uses the application in a different time frame by using the floating license, the application can be used by a plurality of clients more than the number of pooled licenses. Generally, in the floating system, authentication or acquisition of a license is executed when an application is to be activated, and the license is returned when the application is ended. Further, there is provided an application that can support both of the node-locked system and the floating system as the licensing methods of an application. In the case of such an application, a user can use the application by selecting any one of the above systems according to the use.

According to a technique discussed in Japanese Patent Application Laid-Open No. 7-200492, when a client requests activation of an application, a use right management unit included in the client communicates with a license server. The license server permits the use of the application if the number of users who use the application is less than the number of licenses. The use right management unit executes the application if the use of the application is permitted.

According to the license management method using the floating system discussed in Japanese Patent Application Laid-Open No. 7-200492, the license is occupied during the period from the activation to the end of the application. On the other hand, there is provided a resident-type application that is constantly activated and executes processing according to a request in a period during which a client is powered on. If the system discussed in Japanese Patent Application Laid-Open No. 7-200492, in which a floating license is acquired at the time of activating an application, is applied to the resident-type application, the license is consumed in a resident mode. As a result, in a case where many users activate the application in the resident mode, the licenses are depleted regardless of whether the function of the resident-type application is actually in use, and thus the other users cannot be able to use the application.

Further, in some applications, although all of the functions provided by an application are usable when a license is acquired, a part of the functions is restricted when the license is not acquired. In the case of such an application, a part of a user interface (UI) such as an operation menu is displayed in a disabled state (e.g., functions that cannot be used are displayed in a gray-out state) in order to indicate that a part of the functions cannot be used when the license is not acquired. In a case where the license management method using the node-locked system is applied to the above-described application, the license is confirmed when the application is activated, and the UI corresponding to unusable functions are displayed in a gray-out state when the license is invalid. With this configuration, the user can recognize the unusable functions when a menu is displayed. On the other hand, if the license management method using the floating system is applied to the above-described application that changes a UI display by confirming the license at the time of activation, it is necessary to confirm whether the floating license is acquirable when the application is to be activated. Therefore, as described above, such a license management method is not suitable for the resident-type application. Further, if the application disables the UI of the unusable functions by confirming whether the floating license is acquirable at the time of displaying the UI such as an operation menu, the display response of the UI will be degraded because the application executes license confirmation processing every time the operation menu is displayed.

SUMMARY OF THE INVENTION

According to an aspect of the present invention, a client apparatus includes a first determination unit configured to determine whether a license system of an application is a node-locked system or a floating system when the application is activated, a second determination unit configured to determine whether a node-locked license is acquired in a case where the first determination unit determines that the license system of the application is the node-locked system, and an initialization unit configured to initialize a user interface to display a license-required function in an enabled state if the second determination unit determines that the node-locked license is acquired or the first determination unit determines that the license system is the floating system, and initialize a user interface to display the license-required function in a disabled state if the second determination unit determines that the node-locked license is not acquired.

Further features of the present invention will become apparent from the following description of exemplary embodiments with reference to the attached drawings.

BRIEF DESCRIPTION OF THE DRAWINGS

FIG. 6 is a diagram illustrating a user interface (UI).
FIG. 7 is a block diagram illustrating a software configuration of a client according to a second exemplary embodiment.
FIG. 8 (A and B) is a flowchart illustrating processing according to the second exemplary embodiment, which is executed when an application is a resident-type application.

FIG. 11 is a diagram illustrating a UI according to the third exemplary embodiment.

DESCRIPTION OF THE EMBODIMENTS

<System Configuration>

Figure 1:
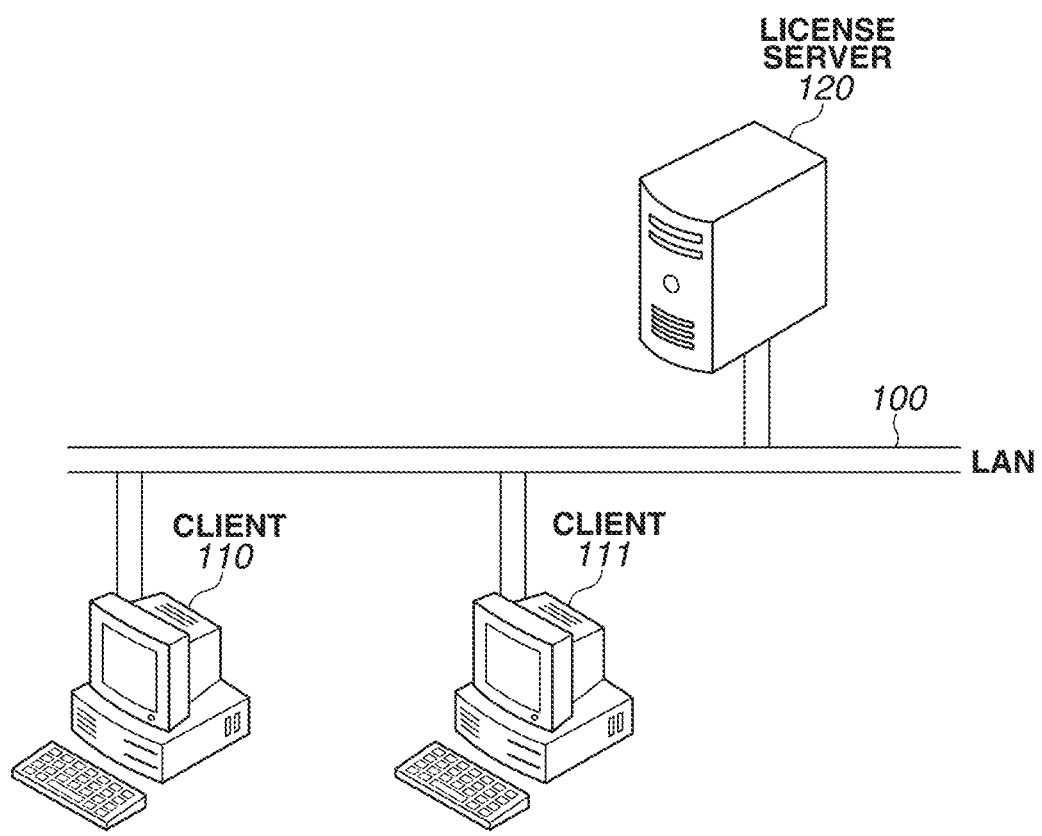
FIG. 1 is a diagram illustrating a system configuration.

FIG. 1 is a diagram illustrating a configuration of a license management system according to a first exemplary embodiment of the present invention. The system according to the present exemplary embodiment enables a license server and a plurality of client apparatuses to communicate with each other via a network.

An application that supports both of the license systems, i.e., the node-locked system and the floating system is installed in the client apparatuses (i.e., clients 110 and 111). When the application uses a license to acquire a use permission, use restrictions set to all or a part of the functions are released, so that the functions become usable. In a case where a license is acquired through the node-locked system, the application transmits a license acquisition request to a main license server (not illustrated). On the other hand, in a case where a license is acquired through the floating system, the application transmits a license acquisition request to a license server 120.

The license server 120 lends a floating license to the application operating in the client 110 (111). In other words, the license server 120 is a local license server that pools a plurality of licenses. The lendable licenses are acquired in advance from the main license server (not illustrated).

In the floating system, a use right (i.e. a license) of the application is temporarily lent to the client 110 (111) that transmits the request. The application is installed in advance in each client 110 (111), and the license is borrowed from the license server 120 when the application is used, so that the client 110 (111) can use the application. Because the borrowed license is returned when use of the application is completed, another client can also use the same application with the same license. Therefore, the application can be shared by the clients more than the number of licenses. In addition, when the license is lent out, the license server 120 may provide a license file to a client, or may simply provide a use right to a client and manage which client holds the use right.

Although a local area network (LAN) 100 is employed in order to enable the client 110 (111) and the license server 120 to communicate with each other, a wide area network (WAN) may be employed instead.

<Hardware Configuration>

Figure 2:
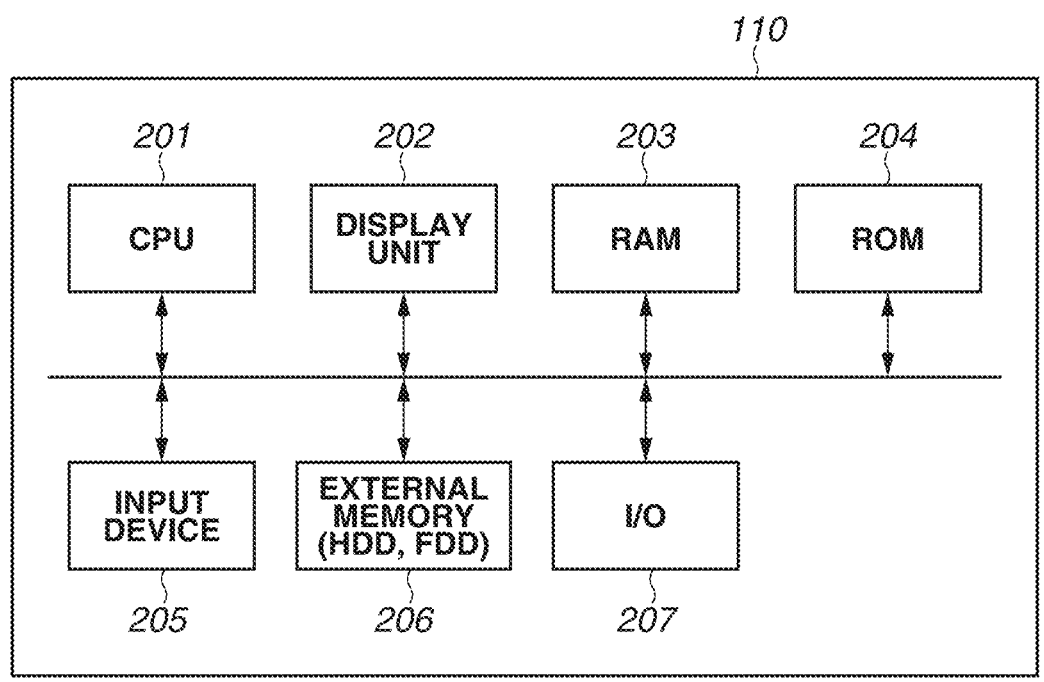
FIG. 2 is a block diagram illustrating a hardware configuration.

FIG. 2 is a block diagram illustrating a hardware configuration of the client 110 (111) and the license server 120 illustrated in FIG. 1. As illustrated in FIG. 2, the client 110 includes an input device 205 such as a keyboard or a pointing device that receives an operation input by a user. Further, the client 110 includes a display unit 202 for visually providing an output information feedback to the user. The client 110 further includes storage devices such as a random access memory (RAM) 203, a read only memory (ROM) 204, and an external memory 206 (hard disk drive (HDD)), which store various programs and various kinds of data according to the present exemplary embodiment. Furthermore, the client 110 includes an interface device input-output (I/O) 207 for communicating with external devices, and a central processing unit (CPU) 201 for executing a program. The CPU 201 included in the client 110 or the license server 120 reads a program stored in the ROM 204 or the external memory 206 to the RAM 203, and executes the read program in order to function as the below-described processing units of the client 110 and the license server 120 illustrated in FIGS. 3 and 4. In addition, the client 110, the license server 120, and the main license server (not illustrated) communicate with each other via the interface device I/O 207.

<Software Configuration>

Figure 3:
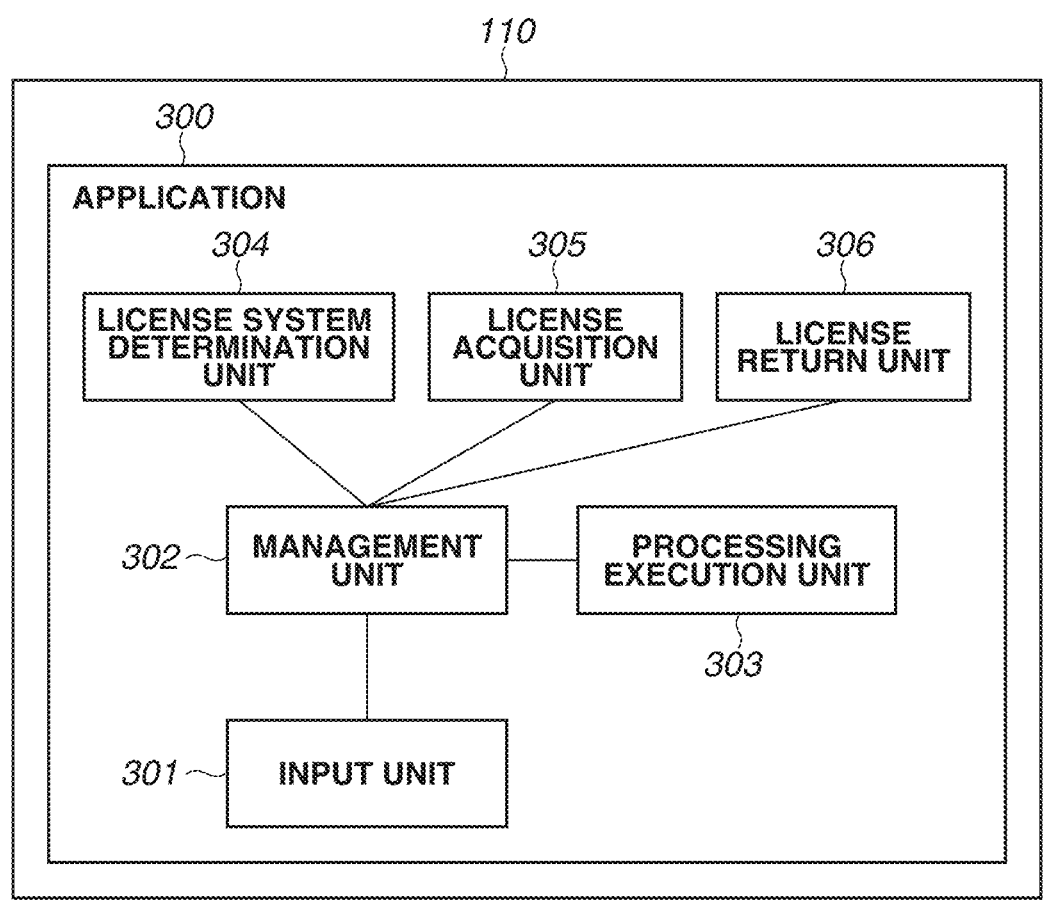
FIG. 3 is a block diagram illustrating a software configuration of a client.

FIG. 3 is a block diagram illustrating an example of a software configuration of an application 300 executed by the client 110. The application 300 is installed in the client 110.

An input unit 301 receives an operation from the user, and informs a management unit 302 of the received request.

When the input unit 301 receives an activation request of the application 300 from the user, the management unit 302 instructs a license system determination unit 304 to determine a license system of the application 300. The license system determination unit 304 determines a license system of the application 300 by referring to license setting information (not illustrated) of the application 300. The license setting information (not illustrated) may be stored in advance in the external memory 206 included in the client 110 as setting information, or may be inquired and acquired from the main license server (not illustrated). The license system determination unit 304 returns the license system as a determination result to the management unit 302. The management unit 302 transmits the license system as the determination result to a license acquisition unit 305 and instructs the license acquisition unit 305 to execute license acquisition processing.

The license acquisition unit 305 executes the license acquisition processing according to the received license system. In a case where the received license system is the node-locked system, license authentication is executed and a result of the license authentication is returned to the management unit 302. In a case where a node-locked license has not been authenticated, a license acquisition request is transmitted to the main license server (not illustrated), so that the license authentication is executed. In addition, in a case where the node-locked license has already been authenticated and the acquisition information of the node-locked license is stored in the client 110, a result of that authentication is returned to the management unit 302. On the other hand, in a case where the received license system is the floating system, the license acquisition unit 305 does not execute the license acquisition processing at this point (i.e., when the application 300 is activated), regards the license as valid, and returns the result to the management unit 302. Because the floating license is regarded as valid, a user interface (UI) is displayed while respective functions of the application 300 are enabled. Thereafter, when the processing is actually executed according to an operation instruction issued by the user, the application 300 is controlled to execute the license acquisition processing.

The management unit 302 receives the license acquisition result from the license acquisition unit 305 and initializes the application 300 according to the result. More specifically, in a case where the license acquisition result is "valid", the UI is initialized to display a UI in which all of the functions of the application 300 are enabled (i.e., all of the functions of the UI which include a license-required function are displayed in an enabled state). On the other hand, in a case where the license acquisition result is "invalid", the UI is initialized to display a UI in which the functions provided free of charge are enabled while the functions provided for a fee are disabled (i.e., a part of the functions (e.g. a license-required function) is displayed in a disabled state).

Further, in a case where the input unit 301 receives a processing execution request with respect to the application 300 from a user, in the same manner as the processing executed at the activation, the management unit 302 instructs the license system determination unit 304 to determine a license system of the application 300 and receives a determination result of the license system. The management unit 302 transmits a license system as the determination result to the license acquisition unit 305 and instructs the license acquisition unit 305 to execute the license acquisition processing.

The license acquisition unit 305 executes the license acquisition processing according to the received license system. In a case where the received license system is the node-locked system, a result of the authentication executed at the activation of the application 300 is returned to the management unit 302. On the other hand, in a case where the received license system is the floating system, the license acquisition unit 305 transmits a license acquisition request to the license server 120, and returns a result of the license acquisition to the management unit 302.

In addition, in response to the license acquisition request, the license server 120 may provide a license file itself or a use right. In a case where the license server 120 provides a use right, the license server 120 manages to which client the use right is lent. In the present exemplary embodiment, regardless of whether to acquire or borrow the license or to simply change a status of the use right, an operation as described above in which the client 110 acquires a license (use right) from the license server 120 is referred to as "license check-out". Further, although the license can be returned through various methods such as transmitting the license file or executing return processing of the use right status, in the present exemplary embodiment, an operation in which the client 110 returns the license (use right) to the license server 120 is referred to as "license check-in" regardless of the type of the return method.

The management unit 302 receives an acquisition result from the license acquisition unit 305 and determines whether the processing, the execution request of which has been received, is executable according to the acquisition result. In a case where the license is valid, the management unit 302 determines that the processing, the execution request of which has been requested, is executable and instructs a processing execution unit 303 to execute the processing. The processing execution unit 303 executes the processing according to the processing execution request received by the application 300 via the input unit 301. On the other hand, in a case where the license is invalid, the management unit determines that the processing, the execution request of which has been requested, is not executable and does not execute the processing. In this case, the user may be notified of the above status through a message.

After executing the processing, the processing execution unit 303 notifies the management unit 302 of completion of the processing. When the management unit 302 is notified of completion of the processing, the management unit 302 instructs a license return unit 306 to return the license. In a case where the license system determined by the license system determination unit 304 is the floating system, the license return unit 306 returns the license to the license server 120.

Figure 4:
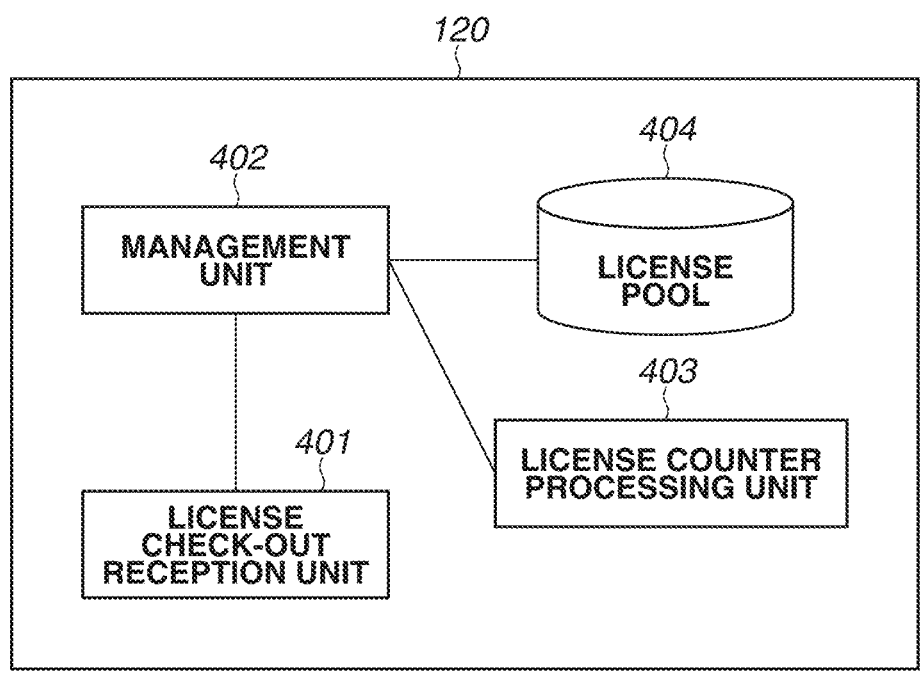
FIG. 4 is a block diagram illustrating a software configuration of a license server.

Next, the license server 120 will be described. FIG. 4 is a block diagram illustrating an example of the software configuration of the license server 120. The license server 120 acquires in advance one or more licenses from the main license server before starting a connection operation with the client 110 through a floating license management system. The one or more licenses are stored in a license pool 404. In the above system, up to the number of acquired licenses stored in the license pool 404, the licenses can be lent out according to a request from the client 110. A total number of the licenses (i.e., the number of clients capable of using the application simultaneously) is assigned as an initial value of a license count managed by a license counter processing unit 403. Respective units will be described below.

A license check-out reception unit 401 receives a check-out request or a check-in request from the application 300 and notifies a management unit 402 of the received request.

In a case where the management unit 402 receives a check-out request, the management unit 402 inquires the license counter processing unit 403 about a license count. The license count represents a remaining number of lendable licenses, and a lendable license remains if the license count is one or more. In this case, the management unit 402 instructs the license counter processing unit 403 to decrement the license count by one, acquires a license from the license pool 404, and returns a success status and a license to the license check-out reception unit 401.

In a case where the license count acquired by the management unit 402 is zero, this indicates that a lendable license does not remain. In this case, the management unit 402 returns a failure status to the license check-out reception unit 401.

The license check-out reception unit 401 returns a success status or a failure status to the management unit 302, while the license is returned thereto together with the success status. As described above, in a case where transmission and reception of the license is not actually executed by the check-out processing, only the processing with respect to the use right status is executed.

When the license check-out reception unit 401 receives a check-in request, the management unit 402 instructs the license counter processing unit 403 to increment the license count by one. In a case where a license file is transmitted and received, the license is returned to the license pool 404.

<License Management Processing>

Figure 5B:
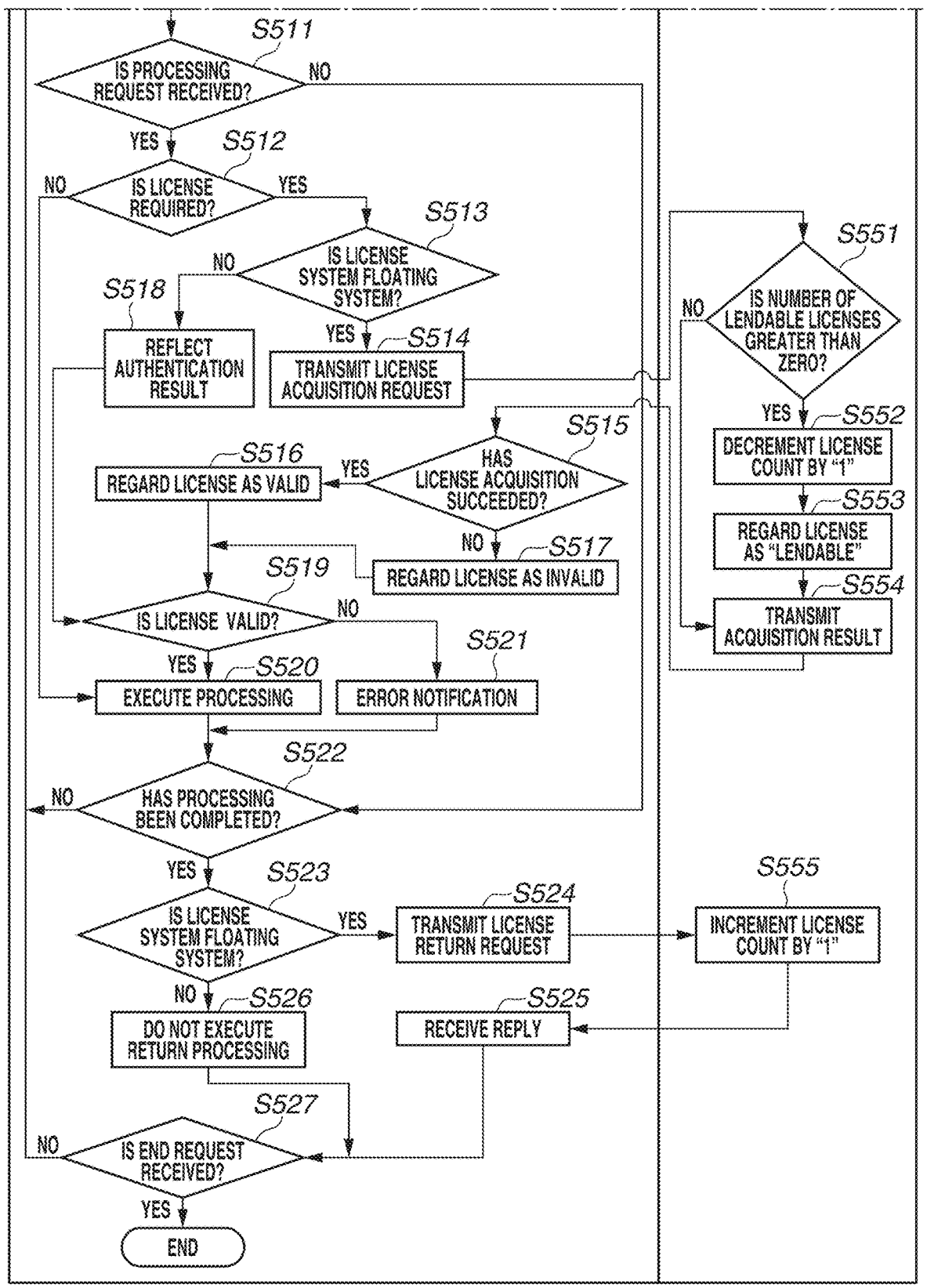
FIG. 5 (A and B) is a flowchart illustrating processing according to a first exemplary embodiment.

FIG. 5 (A and B) is a flowchart illustrating a flow of processing executed by the application 300 and the license server 120.

First, a flow of processing executed when the application 300 acquires a license will be described. In step S501, the input unit 301 of the application 300 receives an activation request of the application 300 and notifies the management unit 302 of the activation request in order to start activation processing of the application 300. In step S502, the management unit 302 that receives the activation request instructs the license system determination unit 304 to determine which of the floating system and the node-locked system is specified as the license system of the application 300. In addition, the license system is specified in advance according to the operation of the user when the application 300 is installed or initially activated. In a case where the license system is determined to be the floating system (YES in step S502), the processing proceeds to step S503. In step S503, the license acquisition unit 305 regards the license of the application 300 as valid. Then, the processing proceeds to step S508. On the other hand, in a case where the license system is determined to be the node-locked system (NO in step S502), the processing proceeds to step S504. In step S504, the management unit 302 inquires the license acquisition unit 305 about whether the license has already been acquired.

In step S504, based on the inquiry result, if it is determined that the license has already been acquired (YES in step S504), the processing proceeds to step S503. In step S503, the license is regarded as "valid", and the processing proceeds to step S508. On the other hand, if it is determined that the license has not been acquired (NO in step S504), the processing proceeds to step S505. In step S505, the management unit 302 instructs the license acquisition unit 305 to execute license authentication processing of the node-locked system, and the license acquisition unit 305 returns a result of the license authentication processing to the management unit 302. In step S506, in a case where the management unit 302 receives a result of the license authentication processing indicating that the acquisition of the node-locked license has succeeded (YES in step S506), the processing proceeds to step S503. In step S503, the license of the application 300 is regarded as "valid". Then, the processing proceeds to step S508. On the other hand, in step S506, in a case where acquisition of the license has not succeeded (NO in step S506), the processing proceeds to step S507. In step S507, the license of the application 300 is regarded as "invalid". Then, the processing proceeds to step S508. Herein, although the license authentication has been executed when it is determined that the node-locked license has not been acquired, the license authentication may be executed by a separate processing flow. In such a case, if it is determined that the license has not been acquired in step S504, the processing may proceed to step S507 and the license may be regarded as "invalid".

In step S508, the management unit 302 initializes the UI of the application 300. In a case where the license is regarded as "valid" in step S503, the UI of the application 300 is not restricted, so that an entire portion of the UI is enabled and displayed (i.e. all of functions (including a license-required-function) of the UI are displayed in an enabled state). On the other hand, in a case where the license is regarded as "invalid" in step S507, the UI of the application 300 is displayed while a part of the UI (e.g., the UI of fee-based functions) is disabled (i.e. a license-required-function (e.g. a fee-based function) is displayed in a disabled state). When the UI of the application 300 is initialized in step S508, the application 300 enters a stand-by state and waits for a user operation. When the input unit 301 receives a user operation with respect to the application 300 in the stand-by state, the processing corresponding to the received operation will be executed.

In step S509, when the input unit 301 receives a function display request through a user operation (YES in step S509), the management unit 302 is notified of the function display request, and the processing proceeds to step S510. In step S510, the management unit 302 displays a menu indicating the functions provided by the application 300.

In step S511, when a function is selected from the menu displayed in step S510 through a user operation and the management unit 302 receives a request for processing the selected function from the input unit 301 (YES in step S511), the processing proceeds to step S512, so that the management unit 302 starts executing the requested processing.

In step S512, the management unit 302 determines whether the function, processing of which has been requested, requires a license. If it is determined that the function does not require the license (NO in step S512), the processing proceeds to step S520. In step S520, the requested processing is executed. On the other hand, if it is determined that the function requires the license (YES in step S512), the processing proceeds to step S513.

In step S513, the management unit 302 instructs the license system determination unit 304 to determine the license system. If the license system is determined to be the node-locked system (NO in step S513), the processing proceeds to step S518. In step S518, the result of the license authentication processed at the activation of the application 300 is reflected thereon. Herein, in a case where the license system is the node-locked system, the UI for the unusable function cannot be selected when the UI of the application 300 is initialized in step S508, and thus the reflected authentication result always indicates that the license is valid.

In step S513, in a case where the license system is determined to be the floating system (YES in step S513), the processing proceeds to step S514. In step S514, the management unit 302 instructs the license acquisition unit 305 to transmit a license acquisition request to the license server 120. When the license acquisition unit 305 receives a reply from the license server 120 with respect to the license acquisition request, the license acquisition unit 305 notifies the management unit 302 of the license acquisition result. In step S515, the management unit 302 refers to the license acquisition result, and in a case where the management unit 302 determines that the license acquisition has succeeded (YES in step S515), the processing proceeds to step S516. In step S516, the license is regarded as "valid". On the other hand, in step S515, in a case where the management unit 302 determines that the license acquisition has not succeeded (NO in step S515), the processing proceeds to step S517. In step S517, the license is regarded as "invalid".

In step S519, the management unit 302 determines whether the license is valid or invalid. In a case where the license is determined to be valid (YES in step S519), the processing proceeds to step S520. In step S520, the management unit 302 instructs the processing execution unit 303 to execute the requested processing. On the other hand, in a case where the license is determined to be invalid (NO in step S519), the processing proceeds to step S521. In step S521, execution of the requested processing is cancelled. At this time, a message indicating that the processing cannot be continued because of the failure of the license acquisition is displayed to notify the user of an error (i.e., a message 605 in FIG. 6 described below is displayed).

In step S522, when the management unit 302 determines that the processing executed in step S520 has been completed (YES in step S522), the processing proceeds to step S523. In step S523, the management unit 302 instructs the license system determination unit 304 to determine a license system. In a case where the license system is determined to be the node-locked system (NO in step S523), the processing proceeds to step S526. In step S526, the return processing is not executed. On the other hand, in a case where the license system is determined to be the floating system (YES in step S523), the processing proceeds to step S524. In step S524, the management unit 302 instructs the license return unit 306 to execute return processing by transmitting a return request of the license acquired in step S514 to the license server 120. Then, in step S525, the management unit 302 receives a reply from the license server 120.

In step S527, the application 300 is ended in a case where an end request of the application 300 is received via the input unit 301 based on a user operation (YES in step S527). In a case where the received request is not the end request (NO in step S527), the processing returns to step S509 so that the application 300 waits for the next operation instruction.

Subsequently, a flow of processing executed by the license server 120 will be described.

When the license server 120 receives the license acquisition request transmitted in step S514, in step S551, the license server 120 confirms the license count managed by the license counter processing unit 403 to determine whether any lendable license remains.

If it is determined that the license remains (YES in step S551) the processing proceeds to step S552. In step S552, the license counter processing unit 403 decrements the license count by one. Then, in step S553, the license is regarded as "lendable", so that the acquisition result is determined to be "successful". In step S554, the license check-out reception unit 401 returns a success status and license information to the application 300. On the other hand, in step S551, if it is determined that the license does not remain (NO in step S551) the processing proceeds to step S554. In step S554, the license check-out reception unit 401 returns a failure status to the application 300.

Further, when the licenser server 120 receives the license return request transmitted in step S524, in step S555, the license counter processing unit 403 of the license server 120 increments the license count by one. Through the above processing, the number of lendable licenses stored in the license server 120 is recovered by one.

The flow of the license management processing executed by the application 300 and the license server 120 has been described as the above. As described above, in a case where the license system is the node-locked system, the license authentication is attempted when the application is activated, and the application (UI) is initialized according to that result. With this configuration, functional restriction can be reflected on the UI when the license is invalid. Accordingly, in a case where the license system is the node-locked system, the application determines whether the processing is executable and restricts the functions via the UI according to a result of the license authentication executed when the application is activated. Therefore, the user can easily recognize the function that is not executable and avoid selecting that function.

On the other hand, in a case where the license system is the floating system, the application (UI) is initialized while the license is regarded as "valid". Therefore, the UI is initialized without having the restriction on the UI when the application is activated. With this configuration, a display response of the operation menu can be improved. Then, in a case where the selected function requires a license and the license system is the floating system, the license acquisition is attempted in order to determine whether the processing is executable according to the acquisition result when the function of the application is to be selected and executed.

With this configuration, it is possible to provide an application operable in both of the node-locked system and the floating system. Further, in a case where the application is used in the floating system, the license is acquired when the processing is executed, and thus the convenience of the user can be improved.

<UI Diagram>

FIG. 6 is a diagram illustrating an example of the UI of the application 300. The application 300 is a resident-type application that is to be activated when an operating system (OS) installed in the client 110 is activated. When the application 300 is activated, a main screen 601 is displayed on the display unit 202 of the client 110. As illustrated in FIG. 6, the main screen 601 of the resident-type application is displayed in an icon-like state, and an operation menu is displayed when the user operates and drags a file over the main screen 601. Then, the processing according to the menu where the file is dropped is executed. Explanatory diagrams 611 to 613 schematically illustrate an operation flow in which the application 300 receives a processing request from the user and executes the processing.

In the explanatory diagram 611, an icon 602 represents a file whereas an icon 603 represents a cursor that enables a user to specify a position on the display unit 202 via the input device 205. When the user selects the file icon 602 with the cursor icon 603 and drags and moves the selected file icon 602 over the main screen 601 to make the file icon 602 stay thereon (i.e., drag-over), the application 300 displays a list of functions (i.e., menu) 604 of the application 300. The explanatory diagram 612 illustrates an example of the menu 604 displayed when the file icon 602 is dragged over the main screen 601. In the present exemplary embodiment, respective functions of print, facsimile transmission, print preview, and page description language (PDF) conversion are displayed as examples. The above functions are merely examples, and thus the other functions provided by the application 300 may be displayed thereon. Thereafter, as illustrated in the explanatory diagram 613, when the user moves the file icon 602 to a desired function in the menu 604 and releases the selected state of the cursor icon 603 (i.e., drops the file icon 602), the application 300 executes the processing of the corresponding function. In a case where the license system is the node-locked system and the node-locked license has already been acquired, a menu illustrated in the explanatory diagram 613 will be displayed. Further, in a case where the license system is the floating system, the menu illustrated in the explanatory diagram 613 will be also displayed.

The explanatory diagram 614 illustrates an example of the UI in which a part of the functions (i.e., menu) cannot be used and disabled, which is to be displayed when the file is dragged over. In a case where the license system is the node-locked system and the license is regarded as "invalid" in step S507 of FIG. 5 (A and B), the above UI in which a part of the functions is restricted is displayed in step S510 of FIG. 5 (A and B).

An explanatory diagram 605 illustrates an example of a message screen for notifying the user of an error in step S521, which is to be displayed in a case where the license system is the floating system and the user selects a function that requires a license although the license acquisition has not succeeded.

In a case where the license system is the floating system, the license is acquired for a period from execution to completion of the processing, so that the license will not be occupied more than necessary. Further, in the floating system, when the application is activated, the license is regarded as "valid" and the UI is initialized. Then, the license is acquired when the processing is to be executed. With this configuration, a display response of the operation menu (i.e., performance in initialization of the UI) is suppressed from being lowered.

Further, in a case where the license system is the node-locked system, license authentication is executed and the UI is initialized when the application is activated. Accordingly, when the license is invalid, a usable operation menu and an unusable operation menu are displayed distinctly, so that the user can recognize the unusable functions before attempting the operation.

As described above, in the application that supports both of the node-locked system and the floating system, the acquisition timing of the license is managed appropriately, so that the convenience of the user can be improved.

In a second exemplary embodiment, the same reference numerals are assigned to the configurations similar to those described in the first exemplary embodiment, and description thereof will be omitted as appropriate.

With respect to a suite of software in which a plurality of applications cooperates with each other, it is necessary to make a group of applications usable as one set. For example, there may be a case where a resident-type application and a non-resident type application intermingle in the application set. As described in the first exemplary embodiment, the resident-type application requires a license at different timing such as at the time of activation or starting the actual processing, whereas the non-resident type application requires a license at the time of activation. Further, in a case where a license of a plurality of applications is managed collectively, it is necessary to share the acquired license among the applications.

In the present exemplary embodiment, description will be given to a configuration in which processing relating to the license management is executed by a license management unit 720 instead of being executed by each of the applications. Hereinafter, the present exemplary embodiment will be described in detail with reference to the software configuration diagram illustrated in FIG. 7 and flowcharts illustrated in FIG. 8 (A and B) and 9 (A and B).

<Software Configuration Diagram>

FIG. 7 is a block diagram illustrating an example of a software configuration of an application 700 executed by the client 110.

In the example of the application 700 according to the present exemplary embodiment, the configuration of the application 700 will be separately described with respect to the resident-type application and the non-resident type application. The resident-type application is activated when the OS is activated, and usable functions are restricted if the license is invalid. In this case, the user can use the functions other than the restricted functions. The non-resident type application is activated when the activation operation of the application is executed by the user, and activation of the application is cancelled if the license is invalid. The application 700 is installed in the client 110.

An input unit 701 receives an operation from the user and informs a management unit 702 of the received request. When the input unit 701 receives an activation request of the application 700, the input unit 701 notifies the management unit 702 of the activation request, so that the management unit 702 transmits a license acquisition request to a license processing request unit 704.

The license processing request unit 704 receives the license acquisition request and transmits the license acquisition request to a license processing request reception unit 721 of a license management unit 720. Herein, an initialization flag is specified as the information specified in the request. The initialization flag mainly identifies whether the request is a call for UI initialization, and "True" represents a call for the UI initialization whereas "False" represents a call for the processing other than the UI initialization. When the application 700 is the resident-type application, the license acquisition request is transmitted by setting the initialization flag to "True". When the application 700 is the non-resident type application, the license acquisition request is transmitted by setting the initialization flag to "False". The license processing request unit 704 receives a license acquisition result from the license management unit 720 and returns the acquisition result to the management unit 702.

The management unit 702 receives the acquisition result from the license processing request unit 704 and initializes the UI according to the acquisition result. In the resident-type application, the UI is initialized while all of the functions are enabled when the license is valid, and the UI is initialized while a part of the functions (e.g., fee-based function) is disabled when the license is invalid. In the non-resident type application, the application 700 is activated when the license is valid, and activation of the application 700 is cancelled when the license is invalid. When the activation thereof is cancelled, the user may be notified of the above status through a message.

Further, in a case where the input unit 701 receives an execution request of processing with respect to the application 700, the input unit 701 notifies the management unit 702 of the execution request, so that the management unit 702 instructs a processing execution unit 703 to execute the requested processing. In the resident-type application, a license acquisition request is transmitted prior to the execution of the requested processing, and according to a result of the license acquisition, the management unit 702 determines whether the requested processing is executable. Similar to the above-described processing, the management unit 702 transmits a license acquisition request to the license processing request unit 704, and determines whether the processing, the execution request of which has been received, is executable according to a result of the license acquisition. In a case where the license is valid and the management unit 702 determines that the processing, the execution request of which has been received, is executable, the management unit 702 instructs the processing execution unit 703 to execute the processing. In a case where the license is invalid and the management unit 702 determines that the processing, the execution request of which has been received, is not executable, the management unit 702 does not instruct the execution of the processing. In such a case, the user may be notified of the above status through a message indicating that the processing cannot be continued. In the resident-type application, the processing execution unit 703 notifies the management unit 702 of completion of the processing when the requested processing is completed or the user ends the application 700. The management unit 702 is notified of the completion of the processing and transmits a license return request to the license processing request unit 704. The license processing request unit 704 executes license return processing with respect to the license management unit 720.

Subsequently, the license management unit 720 will be described. The license management unit 720 executes management of the license between the application 700 and the license server 120. The license management unit 720 receives a license acquisition request from each application and executes processing according to a license mode. In the floating system, the license management unit 720 instantly returns a success status if the license has already been acquired in response to a license request from another application. If the license has not been acquired, the license management unit 720 attempts to acquire the license from the license server 120 and returns the acquisition result. In a case where the license management unit 720 receives a license return request from the application, the license management unit 720 returns the license to the license server 120 when it is determined that all of the applications have completed the processing. In the node-locked system, the license management unit 720 only processes the license acquisition request, and returns an authentication result if the license has already been authenticated. If the license has not been authenticated, the license management unit 720 executes the license authentication and returns a result of the authentication. Each of the units will be described below.

The license processing request reception unit 721 receives the acquisition request or the return request of the license from the license processing request unit 704 of the application 700, and notifies the management unit 722 of the request.

The management unit 722 instructs a license system determination unit 724 to determine the license system. The license system determination unit 724 refers to license setting information (not illustrated) of the application 700 to determine the license system of the application 700. The license setting information (not illustrated) may be stored in advance in the external memory 206 within the client 110 as the setting information, or may be inquired and acquired from the main license server (not illustrated). The license system determination unit 724 returns the license system to the management unit 722 as a determination result.

The management unit 722 instructs a license acquisition unit 725 to execute license acquisition processing according to the received license system. In a case where the license system is the node-locked system, the management unit 722 instructs the license acquisition unit 725 to execute license authentication processing and returns an authentication result. A license acquisition request is transmitted to the main license server (not illustrated), so that the license authentication is executed. In addition, in a case where the license has already been authenticated, a result of that authentication is returned thereto. The above result is provided to the license processing request reception unit 721 and returned to the application 700.

When the license system is the floating system, the management unit 722 inquires of the request counter processing unit 723 about the request count. The request count represents the total number of license acquisition requests currently received from a plurality of applications 700. In a case where the request count is zero, this indicates that the received acquisition request is the first request. Therefore, the management unit 722 instructs the license acquisition unit 725 to acquire the license. The license acquisition unit 725 connects to the license server 120 to transmit a license acquisition request. The license server 120 returns a success status or a failure status according to the success or failure of the license acquisition. Normally, the license server 120 returns a success status if any usable license remains.

The license acquisition unit 725 returns a success status or a failure status of the license check-out to the management unit 722. If it is necessary to maintain a session between the license server 120 and the client 110 to which the license is being lent out in order to monitor the license, the license acquisition unit 725 continuously connects to the license server 120 when the check-out has succeeded.

In a case where a reply from the license acquisition unit 725 is the success status, the management unit 722 instructs the request counter processing unit 724 to increment the request count by one. Further, the management unit 722 returns a result indicating the success or failure of the check-out to the license processing request reception unit 721.

On the other hand, in a case where the request count has already had a value of one or more when the request from the license processing request reception unit 721 is received, this indicates that the license has already been acquired in response to the request from another application. At this time, the management unit 722 instructs the request counter processing unit 724 to increment the request count by one, and returns a success status to the license processing request reception unit 721. The license processing request reception unit 721 receives and returns that result to the application 700.

The license processing request reception unit 721 receives a license return request from the license processing request unit 704 of the application 700 and notifies the management unit 722 of the license return request. According to the license system determined by the license system determination unit 724, the management unit 722 executes license return processing if the license system is the floating system. The management unit 722 instructs the request counter processing unit 724 to decrement the request count by one. In a case where the request count has become zero, this indicates that all of the applications have completed the processing that requires the license. Therefore, the management unit 722 instructs the license return unit 726 to return the license.

The license return unit 726 executes license check-in with respect to the license server 120. Further, the session is disconnected because the license does not have to be monitored.

In addition, the license management unit 720 may be integrally configured and distributed together with the application 700, or may be configured independently from the application 700 in order to make the license management unit 720 be commonly used for a plurality of applications.

<License Management Processing>

FIG. 8 (A and B) and 9 (A and B) are flowcharts illustrating flows of processing executed by the application 700, the license management unit 720, and the license server 120. Respective processing flows will be described by taking the present exemplary embodiment as an example.

The flowchart in FIG. 8 (A and B) illustrates a flow of processing executed when the application 700 is a resident-type application.

In step S801, the input unit 701 of the application 700 receives an activation request of the application 700 and notifies the management unit 702 of the activation request in order to start activation processing of the application 700. In step S802, the management unit 702 receives the activation request and instructs the license processing request unit 704 to acquire the license. The license processing request unit 704 transmits a license acquisition request to the license management unit 720 and notifies the management unit 702 of the acquisition result. When the license acquisition request is transmitted, an initialization flag of the license acquisition request is set to "True".

In step S803, the management unit 702 receives the license acquisition result. In a case where the license is valid (YES in step S803), the processing proceeds to step S804. In step S804, the application 700 is initialized while all of the functions thereof are regarded as usable. In the above initialization, specifically, the UI of the application 700 is displayed while all of the functions thereof are enabled without restriction. In a case where the license is invalid (NO in step S803), the processing proceeds to step S805. In step S805, the application 700 is initialized while a part of the functions thereof is restricted. In the above initialization, specifically, the UI is displayed while the UI for executing a part of the functions such as a fee-based function of the application 700 is disabled.

When the UI is initialized in step S804 or S805, the UI enters a stand-by state and waits for a user operation. In the stand-by state, the processing is executed when the input unit 701 receives an operation with respect to the application 700 from the user. In step S806, when the input unit 701 receives a function display request (i.e., function menu display request) from the user (YES in step S806), the input unit 701 notifies the management unit 702 of the received request, and the processing proceeds to step S807. In step S807, the management unit 702 displays a menu indicating the functions provided by the application 700.

In step S808, when the input unit 701 receives a processing request with respect to the menu displayed in step S807 (YES in step S808), the input unit 701 notifies the management unit 702 of the received request. Then, the processing proceeds to step S809. In step S809, the management unit 702 determines whether a function, processing of which has been requested, requires a license. If it is determined that the function requires the license (NO in step S809), the processing proceeds to step S813. In step S813, the requested processing is executed. On the other hand, if it is determined that the function does not require the license (YES in step S809), the processing proceeds to step S810. In step S810, the management unit 702 instructs the license processing request unit 704 to acquire the license. The license processing request unit 704 transmits a license acquisition request to the license management unit 720. At this time, the license acquisition request is transmitted while the initialization flag is set to "False". The license processing request unit 704 notifies the management unit 702 of a result of the license acquisition processing.

In step S811, the management unit 702 refers to the license acquisition result. If the acquisition of the license has succeeded (YES in step S811), the management unit 702 regards the license as "valid", and the processing proceeds to step S813. In step S813, the requested processing is executed. If the acquisition of the license has not succeeded (NO in step S811), the processing proceeds to step S812. In step S812, the license is regarded as "invalid", and the execution of the processing is cancelled. At this time, a message indicating that the processing cannot be continued because of the failure of the license acquisition (e.g., a message 605 in FIG. 6) is displayed for the user.

The processing in step S813 is executed by the processing execution unit 703. After the processing is completed, the management unit 702 is notified of completion of the processing. In step S814, when the management unit 702 is notified of the completion of the processing (YES in step S814), the processing proceeds to step S815. In step S815, the management unit 702 instructs the license processing request unit 704 to return the license. The license processing request unit 704 transmits a license return request to the license management unit 720 and notifies the management unit 702 of a result of the license return request.

In step S816, the application 700 is ended when the end request of the application 700 is received via the input unit 701 (YES in step S816).

Next, a flow of processing executed by the license management unit 720 will be described. The license processing request reception unit 721 of the license management unit 720 receives the license processing request from the application 700 and executes license acquisition processing or license return processing according to the received request.

When the license processing request reception unit 721 receives the license acquisition request, in step S831, the license processing request reception unit 721 instructs the license system determination unit 724 to determine the license system of the application 700. In a case where the license system is determined to be the node-locked system (NO in step S831), the processing proceeds to step S832.

In step S832, the management unit 722 inquires of the license acquisition unit 724 about whether the license has already been authenticated. If it is determined that the license has already been authenticated (YES in step S832) the processing proceeds to step S834. In step S834, the management unit 722 instructs the license processing request reception unit 721 to return a result of that authentication to the application 700. In step S832, if it is determined that the license has not been authenticated (NO in step S832), the processing proceeds to step S833. In step S833, the management unit 722 instructs the license acquisition unit 724 to execute the license authentication and return a result of that authentication to the management unit 722. In step S843, the management unit 722 instructs the license processing request reception unit 721 to return a result indicating that the license is authenticated to the application 700.

In step S831, in a case where the license system is determined to be the floating system (YES in step S831), the processing proceeds to step S835. In step S835, the management unit 722 refers to information about the acquisition request that is transmitted from the application 700 and received by the license processing request reception unit 721, and determines whether the initialization flag is set to "True". In a case where the initialization flag is "True" (YES in step S835), the processing proceeds to step S836. In step S836, the management unit 722 instructs the license processing request reception unit 721 to regard the license as "valid" to return the result to the application 700. On the other hand, if the initialization flag is "False" (NO in step S835), the processing proceeds to step S837.

In step S837, the management unit 722 confirms the request count managed by the request counter processing unit 723 and determines whether the floating license has already been acquired in response to any of the applications within the application set. In step S837, if it is determined that the license has already been acquired (YES in step S837), the processing proceeds to step S840. In step S840, the management unit 722 instructs the request counter processing unit 723 to increment the request count by one. Then, in step S841, the management unit 722 instructs the license processing request reception unit 721 to return the license acquisition result indicating that the license is regarded as valid to the application 700.

On the other hand, in step S837, if it is determined that the license has not been acquired (NO in step S837), the processing proceeds to step S838. In step S838, the management unit 722 instructs the license acquisition unit 725 to transmit a license acquisition request to the license server 120. The license acquisition unit 725 receives a response to the license acquisition request from the license server 120 and notifies the management unit 722 of the received result. In step S839, the management unit 722 refers to the license acquisition result. In a case where the license acquisition has succeeded (YES in step S839), the management unit 722 regards the license as "valid". Then, the processing proceeds to step S840. In step S840, the management unit 722 instructs the request counter processing unit 723 to increment the request count by one. Then, in step S841, the management unit 722 instructs the license processing request reception unit 721 to return the license acquisition result indicating that the license is regarded as valid to the application 700. If the acquisition of the license has not succeeded (NO in step S839), the processing proceeds to step S841. In step S841, the management unit 722 instructs the license processing request reception unit 721 to return the license acquisition result indicating that the license is regarded as invalid to the application 700.

Further, in a case where the license processing request reception unit 721 receives a license return request transmitted from the application 700 in step S815, in step S842, the management unit 722 instructs the license system determination unit 724 to determine the license system of the application 700. In a case where the license system is the node-locked system (NO in step S842), the processing proceeds to step S843. In step S843, the return processing is not executed. In a case where the license system is the floating system (YES in step S842), the processing proceeds to step S844. In step S844, the management unit 722 instructs the request counter processing unit 723 to decrement the request count by one. In step S845, the management unit 722 refers to the request count. If the management unit 722 determines that the request count is one or more, or determines that the application that is using the license exist (YES in step S845), the management unit 722 ends the processing without executing the processing any further. In step S845, if the management unit 722 determines that the request count is zero, or determines that the application that is using the license does not exist (NO in step S845), the processing proceeds to step S846. In step S846, the management unit 722 transmits a license return request to the license return unit 726. Then, in step S847, the management unit 722 receives a response from the license server 120. The license return unit 726 transmits the license return request to the license server 120.

Next, a flow of processing executed by the license server 120 will be described.

In step S851, according to the license acquisition request transmitted in step S838, the license server 120 confirms the license count managed by the license counter processing unit 403 to determine whether any license remains.

In step S851, if it is determined that the license remains (YES in step S851) the processing proceeds to step S852. In step S852, the license counter processing unit 403 decrements the license count by one. Further, in step S853, the license is regarded as "lendable", and the acquisition result is determined to be "successful". In step S854, the license check-out reception unit 401 returns a success status and the license to the application 700. In step S851, if it is determined that the license does not remain (NO in step S851) the processing proceeds to step S854. In step S854, the license check-out reception unit 401 returns a failure status to the application 700.

Further, according to the license return request transmitted in step S846, in step S855, the license counter processing unit 403 of the license server 120 increments the license count by one. Through the above processing, the number of lendable licenses stored in the license server 120 is recovered by one.

The flow of the license management processing executed by the processing executed by the application 700, the license management unit 720, and the license server 120 has been described as the above.

Figure 9A:
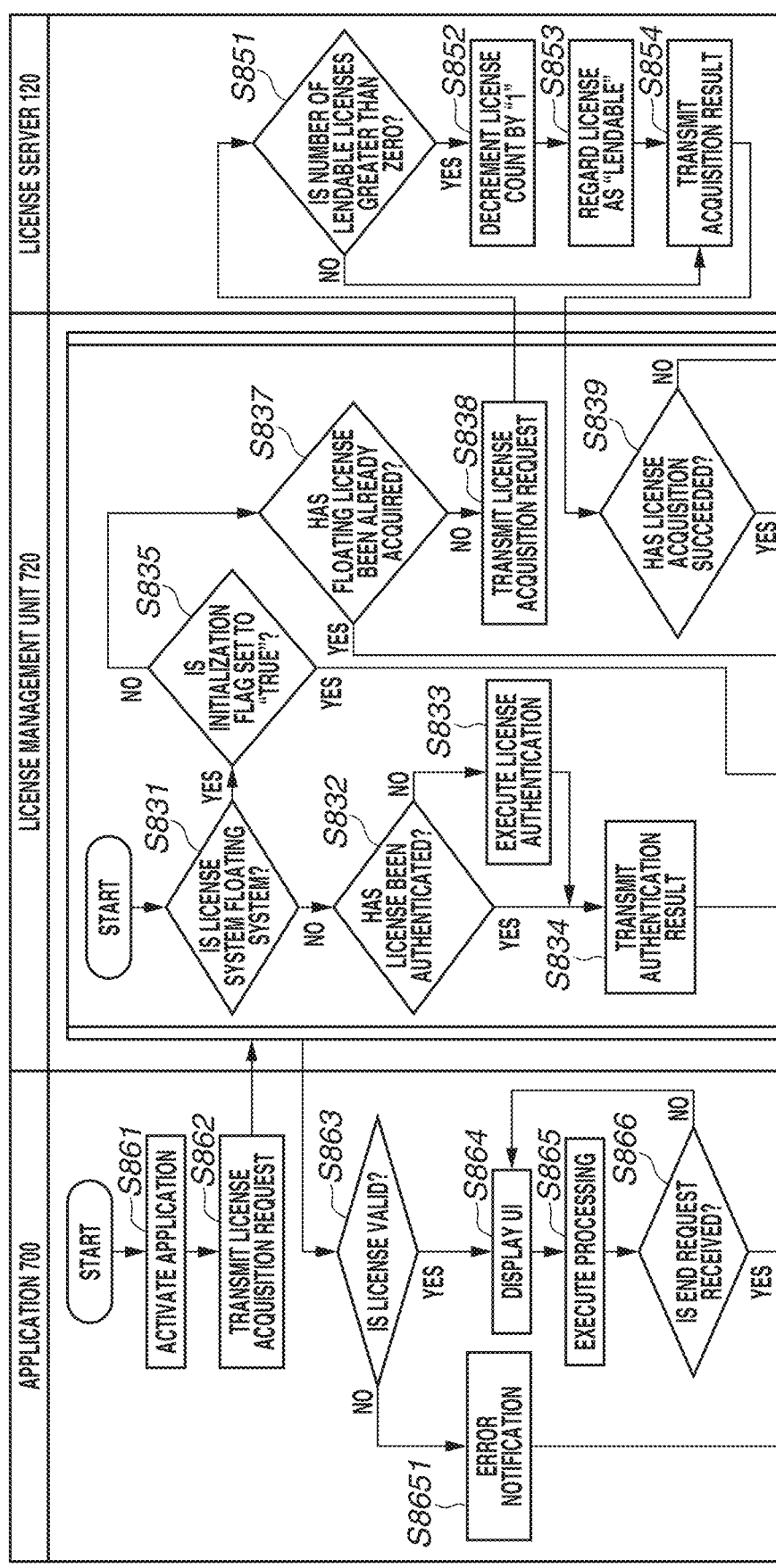
FIG. 9 (A and B) is a flowchart illustrating processing according to the second exemplary embodiment, which is executed when the application is a non-resident type application.
Figure 9B:
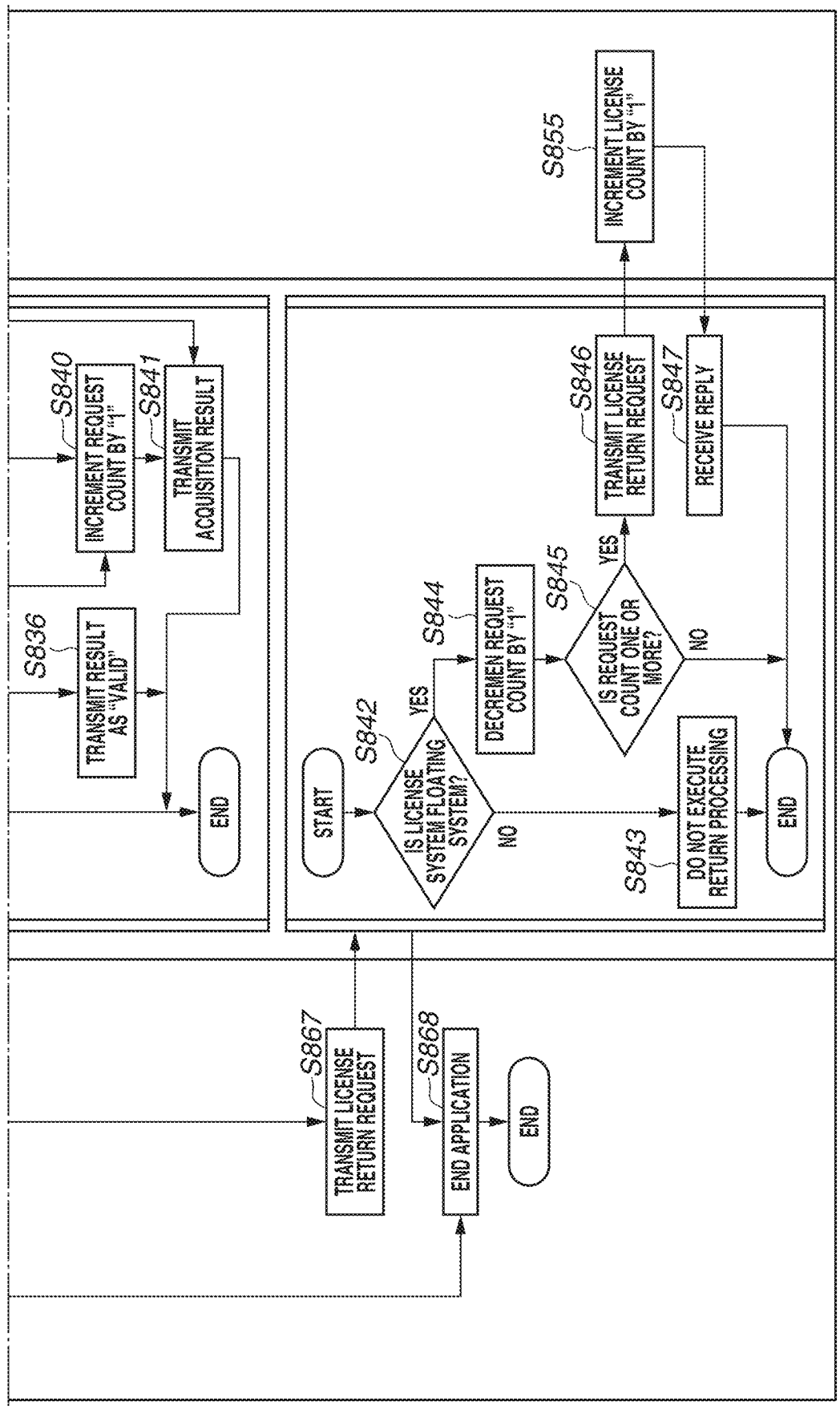

FIG. 9 (A and B) is a flowchart illustrating a flow of processing executed when the application 700 is a non-resident type application. In addition, content of the processing executed by the license management unit 720 and the license server 120 in FIG. 9 (A and B) is the same as that described in FIG. 8 (A and B), and thus description thereof will be omitted.

In step S861, the input unit 701 of the application 700 receives an activation request of the application 700 and notifies the management unit 702 of the activation request in order to start activation processing of the application 700. In step S862, the management unit 702 receives the activation request and instructs the license processing request unit 704 to acquire the license. The license processing request unit 704 transmits a license acquisition request to the license management unit 720. At this time, the initialization flag of the license acquisition request is set to "False". Then, in step S863, the management unit 702 receives the license acquisition result via the license processing request unit 704, and determines whether the license is valid or invalid.

In step S863, in a case where the license is determined to be invalid (NO in step S863), the processing proceeds to step S8651. In step S8651, activation of the application 700 is cancelled. Further, a message indicating that the application 700 cannot be activated is displayed in order to notify the user of the above status.

In step S863, in a case where the license is determined to be valid (YES in step S863), the processing proceeds to step S864. In step S864, the UI of the application 700 is displayed. After the application 700 is activated and the UI is displayed in step S864, in step S865, the processing provided by the application 700 is executed. The above processing is optionally provided by the application 700 and thus the content thereof is not specified in the description given in the present exemplary embodiment.

In step S866, when the application 700 receives an end request of the application 700 via the input unit 701 (YES in step S866) the processing proceeds to step S867. In step S867, the management unit 702 instructs the license processing request unit 704 to return the license. The license processing request unit 704 transmits a license return request to the license management unit 720. After the license is returned thereto, in step S868, the application 700 is ended.

As described above, because the license management processing is executed by the license management unit 720, even in a case where the license management is executed on a plurality of applications as a set, license processing of the applications will not be complicated. Further, each of the applications can execute the license acquisition at suitable timing according to the license system.

As described in the first and the second exemplary embodiments, in a case where the application is the resident-type application in the floating system, the UI in which all of the functions are enabled is displayed when the UI is initialized. Then, the license acquisition is attempted when the processing is to be executed, and the license is returned after execution of the processing. With this configuration, it is possible to control the application to acquire the license only when necessary without holding the license more than necessary in the resident mode. However, the license is kept in a period between execution and completion of the processing, so that the processing may or may not be executed depending on the operation timing because there may be a case where the license is used by another user before the application executes the next operation. In a third exemplary embodiment, in a case where the application fails to acquire the license when the processing is to be executed, the application retries the license acquisition for a certain number of times or a certain period, and notifies the user that the license is usable when the license acquisition has succeeded.

Hereinafter, the present exemplary embodiment will be described in detail with reference to the flowchart illustrated in FIG. 10.

<License Acquisition Retry Processing>

Figure 10:
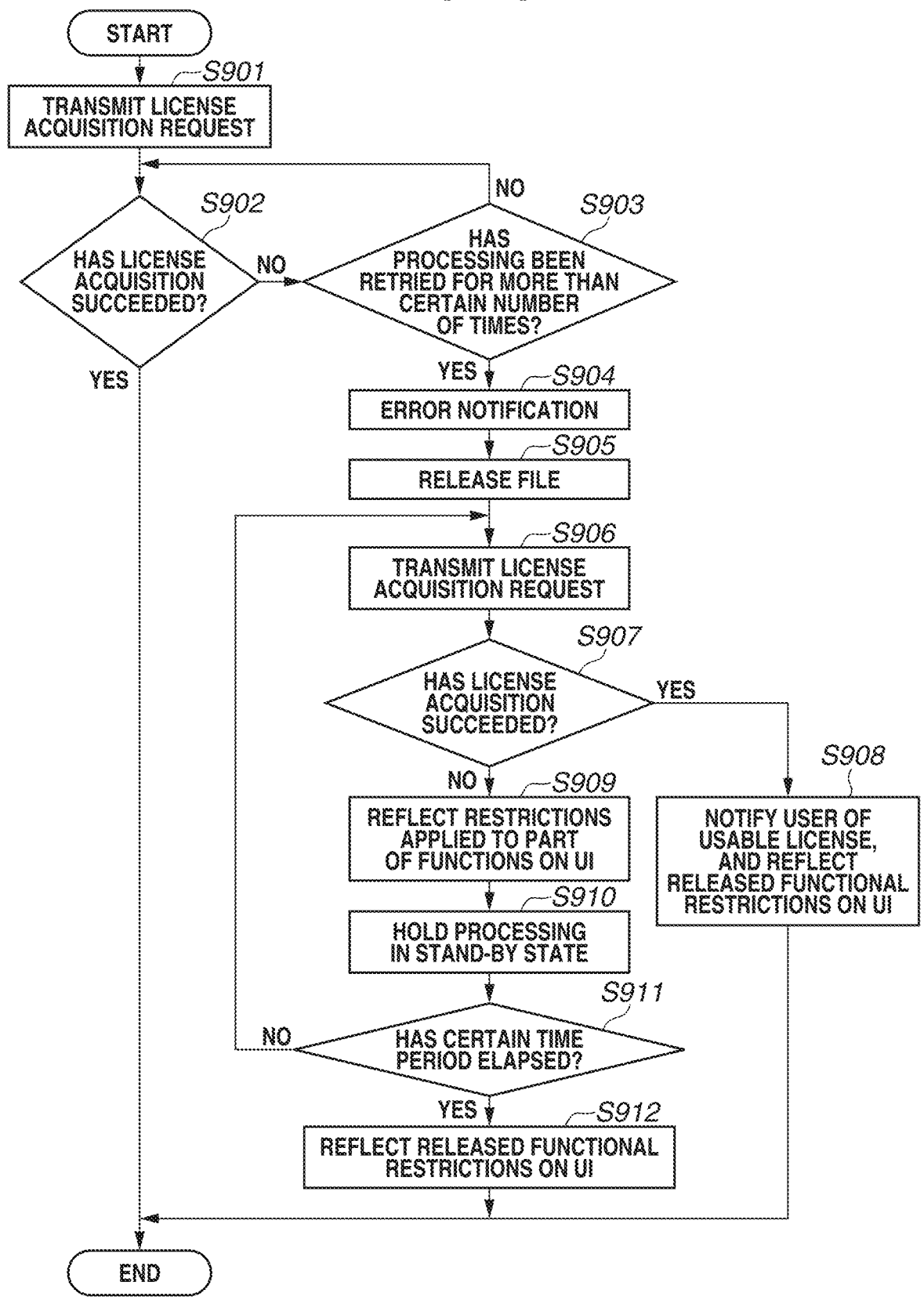
FIG. 10 is a flowchart illustrating processing according to a third exemplary embodiment.

The processing illustrated in FIG. 10 is executed in a case where the license acquisition processing (in step S514 or S810) has not succeeded when the processing is to be executed by the application 300 (700) as a resident-type application. Herein, the processing will be described by using the software configuration of the application 300.

In a case where the license acquisition processing (in step S514) has not succeeded when the processing is to be executed by the application 300, the license acquisition processing is retried for a predetermined number of times as the error processing. In step S901, the management unit 302 instructs the license acquisition unit 305 to execute license acquisition. In step S902, the management unit 302 determines whether the license acquisition has succeeded. In step S902, in a case where the license acquisition has succeeded (YES in step S902), the processing of this flowchart is ended and the processing is executed by the application 300. In a case where the license acquisition has not succeeded (NO in step S902), the processing proceeds to step S903. In step S903, the management unit 302 determines whether the processing in step S901 is retried for more than a certain number of times. A certain number of retry counts may be determined in advance as a setting value of the application 300, and the value thereof can be changed via the UI. In a case where the number of retry counts does not exceed a certain value (NO in step S903), the processing returns to step S901, so that license acquisition is retried. In a case where the number of retry counts exceeds a certain value (YES in step S903), the processing proceeds to step S904. In step S904, a message (e.g., message 605 in FIG. 6) indicating that the processing cannot be continued because of the failure in license acquisition is displayed to the user.

In a case where the license acquisition has not succeeded even though the license acquisition is retried for a certain number of times, the license acquisition is retried for a certain period at a certain interval. In step S905, the management unit 302 releases a file that is specified as a processing target through the operation with respect to the input unit 301. Specifically, the management unit 302 discards the position information of the file kept thereby, and cancels the exclusive state of the file if that file is kept exclusively.

Thereafter, in step S906, the management unit 302 instructs the license acquisition unit 305 to execute the license acquisition. In step S907, the management unit 302 determines whether the license acquisition has succeeded. If the license acquisition has succeeded (YES in step S907), the processing proceeds to step S908. In step S908, the management unit 302 notifies the user of the usable license, releases the functional restriction of the UI (e.g., UI 1002 in FIG. 11), and ends the processing of this flowchart.

In a case where the license acquisition has not succeeded (NO in step S907), the processing proceeds to step S909. In step S909, the management unit 302 reflects the restrictions applied to a part of functions on the UI (e.g., UI 1001 in FIG. 11). Specifically, the UI for executing a part of the functions (i.e., fee-based functions) of the application 300 is disabled. In a case where the floating license is used for the resident-type application, the UI is initialized while all of the functions are enabled. However, when the license acquisition is retried through the above-described processing, the functional restriction is reflected on the UI, and thus it is possible to suppress the unnecessary retry operation executed by the user. After reflecting the functional restriction on the UI in step S909, in step S910, the management unit 302 holds the processing in a stand-by state to have a certain time interval. An amount of the certain time interval may be determined in advance as a setting value of the application 300, and the value thereof can be changed via the UI. After having the certain time interval, in step S911, the management unit 302 determines whether a certain period has elapsed since retry of the license acquisition is started. An amount of the certain period may be determined in advance as a setting value of the application 300, and the value thereof can be changed via the UI. In a case where a certain period has not elapsed (NO in step S911), the processing returns to step S906, so that the license acquisition is retried. In a case where a certain period has elapsed (YES in step S911), the processing proceeds to step S912. In step S912, the management unit 302 releases the functional restrictions reflected by the processing in step S906, and ends the processing of this flowchart.

<UI Diagram>

FIG. 11 is a diagram illustrating examples of the UIs of the application. The UIs such as a UI for notifying the user that the license is usable, a UI in which the functional restriction is released, and a UI in which a part of the functions is restricted, which are respectively displayed in steps S908 and S909 in FIG. 10 are illustrated as the examples.

A UI 1001 illustrates a state where a part of the functions (menu) is disabled. When the license acquisition in step S906 has not succeeded, the UI in which a part of the functions is restricted is displayed in step S909. In order to distinguish between the UI 1001 and the UI illustrated in the explanatory diagram 614 in FIG. 6, disabled functions may be displayed in different expression by using color or shaded lines.

When the license acquisition in step S906 has been retried and succeeded, a UI 1002 is displayed in step S908 in order to notify the user that the license is usable. The user can find out that the application is operable by looking at the above notification, and retry the operation by dragging and dropping the target file, so that the desired processing can be executed.

A UI 1003 is another example of the UI in which a part of the functions is disabled. When the user specifies a facsimile transmission, a destination setting screen is displayed on the UI so that the user can specify a sending address by referring to an address book. This UI 1003 is an example of a setting screen including an address book that requires a license and an address book that does not require a license according to the type thereof. In this setting screen, when the license acquisition in step S906 has not succeeded, a device address book (address book that requires a license) is disabled from among the address books referable in the setting screen, and a message indicating that the license is being confirmed is displayed.

A UI 1004 illustrates a state where the address book disabled in the UI 1003 has released and become usable when the license acquisition in step S906 has been retried and succeeded.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-246349, filed Dec. 4, 2014, which is hereby incorporated by reference herein in its entirety.

What is claimed is:

1. A license management method performed by an apparatus comprising:
    determining, by the apparatus, whether an application running on the apparatus requires a node-locked license system or a floating license system;
    in response to the determination that the application requires the node-locked license system, determining, by the apparatus, whether a node-locked license was acquired;
    in response to the determination that the application requires a floating license system, temporarily setting, by the apparatus, a floating license status as valid, without performing a floating license acquisition procedure by the apparatus;
    based on either the apparatus having acquired the node-locked license or the valid floating license status, initializing, by the apparatus, a user interface on a display of the apparatus, the user interface comprising an object and a hidden menu screen indicating a plurality of menu functions of the application, including a first menu function that does not require a license of the application and a second menu function that does require a license of the application;
    receiving, by the apparatus, a first interface operation in which an icon is dragged and positioned over the object;
    in response to the first interface operation, displaying, by the apparatus, the menu screen and receiving, by the apparatus, a second interface operation in which the dragged icon is dropped over the second menu function of the application;
    determining, by the apparatus, based on the valid floating license status and in response to the second menu function requiring a license, that a floating license acquisition procedure is required;
    in response to the determination that the floating license acquisition procedure is required, performing, by the apparatus, a floating license acquisition procedure with a license server;
    based on a successful floating license acquisition, keeping, by the apparatus, the floating license status set as valid;
    based on an unsuccessful floating license acquisition, changing, by the apparatus, the floating license status to invalid;
    in response to an invalid floating license status, displaying, by the apparatus, an error screen without executing processing of the second menu function; and
    in response to a valid floating license status, processing, by the apparatus, the second menu function.

2. The license management method according to claim 1, the method further comprising:
    in response to the invalid floating license status and error screen display, retrying, by the apparatus for a predetermined number of times, the floating license acquisition procedure with the license server;
    based on a successful floating license acquisition after the error screen display, changing, by the apparatus, the floating license status to valid.

3. The license management method according to claim 2, the method further comprising: functionally restricting, by the apparatus, the user interface by disabling menu functions requiring a license of the application while the floating license acquisition procedure with the license server is retried.

4. The license management method according to claim 3, the method further comprising: based on a successful floating license acquisition after the error screen display, releasing, by the apparatus, the functional restrictions of the user interface and displaying a notification indicating that the requested license is usable.

5. The license management method according to claim 1, wherein the first menu function is one of a print function and a facsimile function, and the second menu function is one of a print preview function and a PDF conversion function.

6. A non-transitory computer-readable storage medium storing executable instructions that, when executed by a processor cause the processor to execute the steps of:
    determine whether an application running by the processor requires a node-locked license system or a floating license system;
    in response to the determination that the application requires the node-locked license system, determine whether a node-locked license was acquired;
    in response to the determination that the application requires a floating license system, temporarily set a floating license status as valid, without performing a floating license acquisition procedure;
    based on either having acquired the node-locked license or the valid floating license status, initialize a user interface on a display, the user interface comprising an object and a hidden menu screen indicating a plurality of menu functions of the application, including a first menu function that does not require a license of the application and a second menu function that does require a license of the application;
    receive a first interface operation in which an icon is dragged and positioned over the object;
    in response to the first interface operation, display the menu screen and receive a second interface operation in which the dragged icon is dropped over the second menu function of the application;
    determine, based on the valid floating license status and in response to the second menu function requiring a license, that a floating license acquisition procedure is required;

in response to the determination that the floating license acquisition procedure is required, perform a floating license acquisition procedure with a license server;

based on a successful floating license acquisition, keep the floating license status set as valid;

based on an unsuccessful floating license acquisition, change the floating license status to invalid;

in response to an invalid floating license status, display an error screen without executing processing of the second menu function; and in response to a valid floating license status, process the second menu function.

7. The non-transitory computer-readable storage medium of claim 6 further storing instructions that, when executed by the processor cause the processor to execute the steps of:

in response to the invalid floating license status and error screen display, retry, for a predetermined number of times, the floating license acquisition procedure with the license server;

based on a successful floating license acquisition after the error screen display, change the floating license status to valid.

8. The non-transitory computer-readable storage medium of claim 7 further storing instructions that, when executed by the processor cause the processor to execute the steps of:

functionally restrict the user interface by disabling menu functions requiring a license of the application while the floating license acquisition procedure with the license server is retried.

9. The non-transitory computer-readable storage medium of claim 8 further storing instructions that, when executed by the processor cause the processor to execute the steps of:

based on a successful floating license acquisition after the error screen display, release the functional restrictions of the user interface and display a notification indicating that the requested license is usable.

10. The non-transitory computer-readable storage medium of claim 6, wherein the first menu function is one of a print function and a facsimile function, and the second menu function is one of a print preview function and a PDF conversion function.

11. An apparatus comprising:

at least one processor and at least one memory coupled to the at least one processor, the at least one memory storing executable instructions, which, when executed by the at least one processor, cause the at least one processor to:

determine, by the apparatus, whether an application running on the apparatus requires a node-locked license system or a floating license system;

in response to the determination that the application requires the node-locked license system, determine whether a node-locked license was acquired;

in response to the determination that the application requires a floating license system, temporarily set, by the apparatus, a floating license status as valid, without performing a floating license acquisition procedure by the apparatus;

based on either the apparatus having acquired the node-locked license or the valid floating license status, initialize, by the apparatus, a user interface on a display of the apparatus, the user interface comprising an object and a hidden menu screen indicating a plurality of menu functions of the application, including a first menu function that does not require a license of the application and a second menu function that does require a license of the application;

receiving, by the apparatus, a first interface operation in which an icon is dragged and positioned over the object;

in response to the first interface operation, display, by the apparatus, the menu screen and receive, by the apparatus, a second interface operation in which the dragged icon is dropped over the second menu function of the application;

determine, by the apparatus, based on the valid floating license status and in response to the second menu function requiring a license, that a floating license acquisition procedure is required;

in response to the determination that the floating license acquisition procedure is required, perform, by the apparatus, a floating license acquisition procedure with a license server;

based on a successful floating license acquisition, keep, by the apparatus, the floating license status set as valid;

based on an unsuccessful floating license acquisition, change, by the apparatus, the floating license status to invalid;

in response to an invalid floating license status, display, by the apparatus, an error screen without executing processing of the second menu function; and in response to a valid floating license status, process, by the apparatus, the second menu function.

12. The client apparatus of claim 11, the at least one memory further storing executable instructions, which, when executed by the at least one processor, cause the at least one processor to:

in response to the invalid floating license status and error screen display, retry, for a predetermined number of times, the floating license acquisition procedure with the license server;

based on a successful floating license acquisition after the error screen display, change the floating license status to valid.

13. The client apparatus of claim 12, the at least one memory further storing executable instructions, which, when executed by the at least one processor, cause the at least one processor to: functionally restrict the user interface by disabling menu functions requiring a license of the application while the floating license acquisition procedure with the license server is retried.

14. The client apparatus of claim 13, the at least one memory further storing executable instructions, which, when executed by the at least one processor, cause the at least one processor to: based on a successful floating license acquisition after the error screen display, release the functional restrictions of the user interface and display a notification indicating that the requested license is usable.

15. The client apparatus of claim 11, wherein the first menu function is one of a print function and a facsimile function, and the second menu function is one of a print preview function and a PDF conversion function.

* * * * *